US012464040B2

(12) United States Patent
Hammam et al.

(10) Patent No.: US 12,464,040 B2
(45) Date of Patent: Nov. 4, 2025

(54) ESTABLISHING A BIDIRECTIONAL CONNECTION BETWEEN A CLIENT AND A REMOTE NODE

(71) Applicant: Telefonaktiebolaget LM Ericsson (publ), Stockholm (SE)

(72) Inventors: Tarik Hammam, Kista (SE); Anders Franzen, Trångsund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/715,329

(22) PCT Filed: Dec. 21, 2021

(86) PCT No.: PCT/EP2021/087028
§ 371 (c)(1),
(2) Date: May 31, 2024

(87) PCT Pub. No.: WO2023/117059
PCT Pub. Date: Jun. 29, 2023

(65) Prior Publication Data
US 2025/0039258 A1    Jan. 30, 2025

(51) Int. Cl.
*G06F 15/16* (2006.01)
*H04L 61/2521* (2022.01)
(Continued)

(52) U.S. Cl.
CPC ...... *H04L 67/1023* (2013.01); *H04L 61/2521* (2013.01); *H04L 67/1012* (2013.01)

(58) Field of Classification Search
CPC ............. H04L 67/1023; H04L 61/2521; H04L 67/1012
(Continued)

(56) References Cited

U.S. PATENT DOCUMENTS 7,272,613 B2 * 9/2007 Sim .................. H04L 69/14
707/999.102
8,499,093 B2 * 7/2013 Grosser .............. H04L 67/1023
370/392
(Continued)

OTHER PUBLICATIONS

International Search Report and Written Opinion mailed Apr. 4, 2022 in corresponding International Application No. PCT/EP2021/087028 (10 pages).
(Continued)

*Primary Examiner* — Alicia Baturay
(74) *Attorney, Agent, or Firm* — Rothwell, Figg, Ernst & Manbeck, P.C.

(57) ABSTRACT

A method for establishing a bidirectional connection between a client and a remote node is disclosed. The method is performed by a processing unit that is a member of a cluster of processing units implementing clients for a communication network node, wherein each member of the cluster comprises at least one identifier that is unique within the cluster, and wherein each member of the cluster shares the same Virtual Internet Protocol (VIP) address. An eligible dynamically allocated connection resource value for the connection comprises a resource value which ensure distribution coherency for packets returned on the connection, and a permissible dynamically allocated connection resource value for the connection comprises a resource value which will not cause a protocol violation of a protocol used for establishing the bidirectional connection.

20 Claims, 21 Drawing Sheets

(51) Int. Cl.
  *H04L 67/1012* (2022.01)
  *H04L 67/1023* (2022.01)
(58) Field of Classification Search
  USPC .......................................................... 709/203
  See application file for complete search history.

(56) References Cited

U.S. PATENT DOCUMENTS

| | | | | |
|---|---|---|---|---|
| 8,549,146 | B2 | 10/2013 | Stanisic et al. | |
| 9,432,449 | B2* | 8/2016 | Mericle | H04L 41/0806 |
| 9,774,537 | B2* | 9/2017 | Jain | H04L 45/24 |
| 9,774,667 | B2* | 9/2017 | Bhagwat | H04L 41/0895 |
| 10,135,737 | B2* | 11/2018 | Jain | H04L 47/70 |
| 10,257,095 | B2* | 4/2019 | Jain | H04L 45/24 |
| 10,320,679 | B2* | 6/2019 | Jain | H04L 67/1025 |
| 10,341,233 | B2* | 7/2019 | Jain | H04L 47/70 |
| 10,999,361 | B2 | 5/2021 | Husar et al. | |
| 11,190,484 | B2* | 11/2021 | Beredimas | H04L 61/5007 |
| 11,316,791 | B2* | 4/2022 | Sheldon | G06F 9/5077 |
| 2002/0044549 | A1* | 4/2002 | Johansson | H04W 40/32 |
| | | | | 370/386 |
| 2006/0080446 | A1* | 4/2006 | Bahl | H04L 67/1001 |
| | | | | 709/227 |
| 2012/0066371 | A1* | 3/2012 | Patel | H04L 67/1031 |
| | | | | 709/224 |
| 2019/0394131 | A1* | 12/2019 | Pfister | H04L 47/21 |

OTHER PUBLICATIONS

Pit-Claudel et al., "Stateless Load-Aware Load Balancing in P4", 2018 IEEE 26th International Conference on Network Protocols (ICNP), IEEE, Sep. 25, 2018 (Sep. 25, 2018), p. 418-423 (6 pages).

* cited by examiner

ESTABLISHING A BIDIRECTIONAL CONNECTION BETWEEN A CLIENT AND A REMOTE NODE

CROSS REFERENCE TO RELATED APPLICATION(S)

This application is a 35 U.S.C. § 371 National Stage of International Patent Application No. PCT/EP2021/087028, filed Dec. 21, 2021, designating the United States.

TECHNICAL FIELD

The present disclosure relates to methods for establishing a bidirectional connection between a client and a remote node, and for processing traffic on a bidirectional connection between a client and a remote node. The methods are performed by a processing unit and a Stateless Load Balancer respectively, and the present disclosure also relates to a processing unit, a Stateless Load Balancer, and to a computer program product configured, when run on a computer, to carry out methods for establishing a bidirectional connection between a client and a remote node, and for processing traffic on a bidirectional connection between a client and a remote node.

BACKGROUND

In a communication network, many of the nodes in the core network are required to communicate with remote entities located in other communication network nodes using Internet Protocol (IP) based bi-directional transport protocol connections. This communication may be for example to support call control signal processing, and is preferably performed without the use of Network Address Translation (NAT) in the end-to-end communication paths. Such communication network nodes are often implemented as a software system deployed on a plurality of individual processing units or computers, these computers forming a computer cluster. The cluster uses a set of scalable server load balancers for the distribution of datagrams arriving from an external communication network internet that is used to interconnect a plurality of different commination network nodes.

In a typical communication network node that is implemented on a computer cluster, the plurality of computers in the cluster are collectively assigned a particular common Internet Protocol (IP) address. In this manner, the plurality of computers of the cluster will appear in terms of addressing as a single logical network device to remote entities external communication network internet. This type of collectively assigned IP address is commonly referred to as a Virtual IP (VIP) address.

The computers in the clusters may be realized by means of Virtual Machines (VMs) deployed in a cloud computing arrangement and may sometimes alternatively be realized using para-virtualization supported processing or a combination of both virtualization techniques. The paravirtualization based processing units are sometimes referred to as Containers in some operating systems (such as Linux). In some environments, a jointly addressable, tightly bound and computer local aggregate of such Containers is referred to as a Pod (such as in Cloud Native systems, for example in Kubernetes®). In the present disclosure, the term "computer" is generally used to refer to a processing unit that may be virtualized in some form similar to that described above.

The transport protocol layer with which the present disclosure is concerned is sometimes referred to as the OSI model layer-4 protocol level. Existing load balancing processes associated with this protocol layer are often referred to as layer-4 server load balancing. The protocol layers above the transport protocol layer are typically application specific. The internode handling of tele-traffic signaling protocols is often carried by Session Initiation Protocol (SIP), which is a good example of a protocol which does not lend itself self well for use together with NAT. In addition, SIP may be carried over two different layer-4 protocols; TCP, which is inherently bidirectional, or a UDP bidirectional setup forming a pseudo session. Another example of a protocol that belongs to the application layer above the transport protocol layer is the Diameter Protocol, which is commonly used in communication network systems for authentication, authorization, and accounting. Diameter can be carried either over TCP or SCTP which both are inherently bidirectional.

Load balancing for computer clusters may be stateful or stateless. Stateful server load balancing implies a memorization of distribution related information during an entire life cycle of connections. As the number of connections to load balance increases, the memory resource required for memorizing the distribution information consequently increases proportionately. In addition, if two or more load balancers are used for redundancy purposes in high availability systems, the memorized distribution related information needs to be replicated across the server load balancers. Such replication steps add system complexity and cost for this type of technical solution. The use of stateful load balancers is however an established technique and is typically considered to be well suited for achieving an even distribution of traffic load to the traffic terminating targets.

Advances in stateless load distribution algorithms, with respect both to distribution evenness and hash-key reshuffling gracefulness, has increased the practical usefulness of stateless server load balancing in many areas of applicability, including communication networks. Practical implementations of the Maglev Algorithm, Consistent Hashing and a variety of Rendezvous Hashing schemes demonstrate the viability of stateless server load balancing in an increasing range of application scenarios. This viability brings new opportunities for taking advantage of the technical simplicity of modern stateless load balancing techniques. The lower realization costs and robust simplicity of stateless load balancing redundancy solutions, and the greatly reduced memory resource requirement that is associated with this type of technique, make stateless load balancing an attractive solution proposition.

Stateless server load balancers can be deployed in networks to receive traffic from an external network and algorithmically distribute IP datagrams of incoming traffic based on a mathematical hash calculation performed upon information in the IP datagram packet, for example in its header. The datagrams are directed to one of a plurality of computers in a cluster, each computer having a specific target node identity. If, after the inspection of an arriving IP packet's header, the inspection result indicates that the destination IP address of the IP packet matches a preconfigured VIP address, then a load balancer internal function, referred to herein as the Target Selector Hashing Function (TSHF), is called upon the IP packet information carried in the header of this packet, as the packet arrives from the external network. The TSHF typically considers as input parameters information in the IP packet header, together with available topology information which reflects the number of available target computers. The TSHF then calculates a hash value which maps to a specific distribution target identity associated with one of the computers in the cluster to which the VIP address is assigned. A forwarding function on the load balancers will then forward the packet to one of the computers based on the calculated hash result, which result points, either directly or through an additional indirection step, to a distribution target.

Virtual IP solutions based on Network Address Translation (NAT) are a commonly used technique for altering information in the IP packet header. With NAT it is possible to achieve the desired result of having a common VIP address appear to represent the source IP address of a set of transport protocol connections originating from different processors within a processor cluster. However, for the implementation deployment scenarios of several typical communication network protocols, including SIP, SCTP or IPsec based protocols, the use of NAT is a problematic technical obstacle. This is particularly the case when used in conjunction with redundancy solutions, which are often required in high availability systems of communication networks. The inherent technical challenges with NAT in a scalable and resiliency supported communication networks setting often result in prohibitive levels of solution complexity. Consequently, existing networks tend to use stateful load balancer solutions, which can achieve a NAT-free common source IP that would represent a set of transport protocol connections originating from different processors within a processor cluster, and which works well with protocols which are otherwise sensitive to address translation. However, these solutions are based on stateful server load balancers that dynamically track the connection data over time on the load balancers, and carry the above mentioned disadvantages.

From a redundancy perspective, stateless load balancers offer the advantage of a much greater technical simplicity, as both the primary load balancer unit and any additional backup load balancer unit can at any time perform the same task without a need for the extra standby unit to be updated with state information prior to failover. As no traffic related state information is memorized in a stateless load balancer, there is no need for any complex protocols for state replication handling to a standby load balancer. Additionally, scalability of load balancing capacity with stateless load balancers becomes a matter of simply adding more of the logically equal new load balancers, which do not need to be updated with any replicated traffic data or state information.

A further benefit of this technique can be realized if stateless load balancing is based on algorithmic methods that are designed for good topology adaptability, including, for example, algorithmic methods such as Consistent Hashing, Rendezvous Hashing or Maglev Hashing, which are able to handle topology changes with minimal negative distribution reshuffling impact. This adaptability to topological changes is highly desirable for dynamically evolving communication networks, but as discussed above, in order to be compatible with the range of communication network protocols, a NAT free solution for bidirectional, cluster originating communication with an entity in a computer cluster is required. Such a solution is not currently available in the prior art.

U.S. Pat. No. 10,999,361 discloses a Consistent Hash-Based Load Balancer for traffic distribution in the incoming direction towards a plurality of computers, but is not concerned with cluster originated bidirectional communication, which poses particular challenges. U.S. Pat. No. 8,549,146 discloses stateless forwarding of load balanced packets but concerns inscription of VTAG values and is thus limited to the SCTP protocol.

SUMMARY

It is an aim of the present disclosure to provide methods, a processing unit, a stateless load balancer, and a computer program product which at least partially address one or more of the challenges discussed above. It is a further aim of the present disclosure to provide methods, a processing unit, a stateless load balancer, and a computer program product which cooperate to achieve the establishment of NAT-free outbound transport protocol connections using stateless hashing methods.

According to a first aspect of the present disclosure, there is provided a method for establishing a bidirectional connection between a client and a remote node, the method performed by a processing unit that is a member of a cluster of processing units implementing clients for a communication network node, wherein each member of the cluster comprises at least one identifier that is unique within the cluster, and wherein each member of the cluster shares the same Virtual Internet Protocol (VIP) address. The method comprises receiving, from a client running on the processing unit, a request for a bidirectional connection to a remote node, the request including static connection data comprising addressing data for the remote node. The method further comprises identifying an eligible and permissible dynamically allocated connection resource value for the connection, and initiating the connection using the static connection data and the identified eligible and permissible dynamically allocated connection resource value. An eligible dynamically allocated connection resource value for the connection comprises a resource value which, when combined with an input based on the static connection data and the VIP address of the cluster, and input to a Target Selector Hashing Function (TSHF) used by a Stateless Load Balancer serving the cluster, generates an output from the TSHF that corresponds to an identifier of the processing unit. A permissible dynamically allocated connection resource value for the connection comprises a resource value which will not cause a protocol violation of a protocol used for establishing the bidirectional connection.

According to another aspect of the present disclosure, there is provided a method for processing traffic on a bidirectional connection between a client and a remote node, the method performed by a Stateless Load Balancer serving a cluster of processing units implementing clients for a communication network node, wherein each member of the cluster comprises at least one identifier that is unique within the cluster, and wherein each member of the cluster shares the same Virtual Internet Protocol (VIP) address. The method comprises receiving, from a remote node, a datagram addressed to a client running on a processing unit of the cluster, using connection data for the connection included with the received datagram to generate an input, providing the generated input to a Target Selector Hashing Function (TSHF) running on the Stateless Load Balancer and obtaining from the TSHF an output corresponding to an identifier of a processing unit in the cluster. The method further comprises forwarding the received datagram to the identified processing unit. The bidirectional connection was established using a method according to an example of the present disclosure, and the connection data for the connection included with the received datagram comprises addressing data for the remote node, the VIP address of the cluster, and the eligible and permissible dynamically allocated connection resource value identified by the processing unit when establishing the connection.

According to another aspect of the present disclosure, there is provided a processing unit for establishing a bidirectional connection between a client and a remote node, wherein the processing unit is a member of a cluster of processing units implementing clients for a communication network node, wherein each member of the cluster comprises at least one identifier that is unique within the cluster, and wherein each member of the cluster shares the same Virtual Internet Protocol (VIP) address. The processing unit comprising processes circuitry configured to cause the processing unit to receive, from a client running on the processing unit, a request for a bidirectional connection to a remote node, the request including static connection data comprising addressing data for the remote node. The processing unit is further configured to cause the processing unit to identify an eligible and permissible dynamically allocated connection resource value for the connection, and initiate the connection using the static connection data and the identified eligible and permissible dynamically allocated connection resource value. An eligible dynamically allocated connection resource value for the connection comprises a resource value which, when combined with an input based on the static connection data and the VIP address of the cluster, and input to a Target Selector Hashing Function (TSHF) used by a Stateless Load Balancer serving the cluster, generates an output from the TSHF that corresponds to an identifier of the processing unit. A permissible dynamically allocated connection resource value for the connection comprises a resource value which: will not cause a protocol violation of a protocol used for establishing the bidirectional connection.

According to another aspect of the present disclosure, there is provided a Stateless Load Balancer for processing traffic on a bidirectional connection between a client and a remote node, wherein the Stateless Load Balancer is for serving a cluster of processing units implementing clients for a communication network node, wherein each member of the cluster comprises at least one identifier that is unique within the cluster, and wherein each member of the cluster shares the same Virtual Internet Protocol (VIP) address. The Stateless Load Balancer comprises processing circuitry configured to cause the Stateless Load Balancer to receive, from a remote node, a datagram addressed to a client running on a processing unit of the cluster. The processing unit is further configured to cause the Stateless Load Balancer to use connection data for the connection included with the received datagram to generate an input, and to provide the generated input to a Target Selector Hashing Function (TSHF) running on the Stateless Load Balancer and obtain from the TSHF an output corresponding to an identifier of a processing unit in the cluster. The processing unit is further configured to cause the Stateless Load Balancer to forward the received datagram to the identified processing unit. The bidirectional connection was established using a method according to any examples of the present disclosure, and the connection data for the connection included with the received datagram comprises addressing data for the remote node, the VIP address of the cluster, and the eligible and permissible dynamically allocated connection resource value identified by the processing unit when establishing the connection.

Aspects and examples of the present disclosure thus provide methods that enable a stateless load balancer serving a cluster of processing units that share a VIP to ensure that return packets on a bidirectional connection established by one of the processing units are returned to the correct processing unit. This return of packets to the correct processing unit is ensured without recourse to Network Address Translation (NAT).

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Examples of the present disclosure achieve the establishment of NAT-free outbound transport protocol layer (OSI layer-4) bidirectional connections from entities in a computer cluster implementing a communication network node, and the load balancing of the return packets that arrive in response to such connections, through the use of stateless load balancing techniques. The return packet load balancing ensures that return packets are directed to the entity in the cluster from which the bidirectional connection originated, without recourse to NAT. For the distribution of return packet traffic in response to the outgoing connections, examples of the present disclosure enable the use of a type of hash algorithms in the load balancers that can efficiently handle scale-up or scale-down of the number target computers in the cluster, for example, the Consistent Hashing algorithm or Maglev algorithm. Enabling the use of this type of algorithm for the handling the return traffic packets of outgoing transport protocol connections provides considerable advantages in terms of simplicity of technical implementation, memory resource requirements, and capacity to handle changing topology in a communication network.

Examples of the present disclosure support two different operational modes. A first operational mode, referred to as on-the-fly calculation mode, is optimized for situations of rapidly changing cluster network conditions. A second operational mode, referred to as pre-calculated mode, is optimized for a quicker connection setup, and may be preferentially used during periods of stable cluster network topology conditions.

In on-the-fly calculation mode, upon reception of a connection setup request from a software client on a computer in the cluster, the computer invokes an on-the-fly calculation and acquisition of Distribution Directing Connection Parameter Data. This data is discussed in greater detail below, but for example comprise source port number in the case of an outgoing TCP connection. This data is used in the connection setup and will determine the distribution by a stateless load balancers of the outgoing connection's return packet traffic.

In pre-calculated mode, upon reception of a connection setup request from a software client on a computer in the cluster, the computer relies on pre-calculated Distribution Directing Connection Parameter Data (for example source port number for an outgoing TCP connection). According to this mode of operation, a mapping function and use of addressing data classes enable a pre-calculated reuse of Distribution Directing Connection Parameter Data resources.

A combination of both modes of operation may be used to achieve fast connection setup times during longer periods of stable network topology, with an option to fall back to on-the-fly calculation during changing network conditions.

Figure 1:
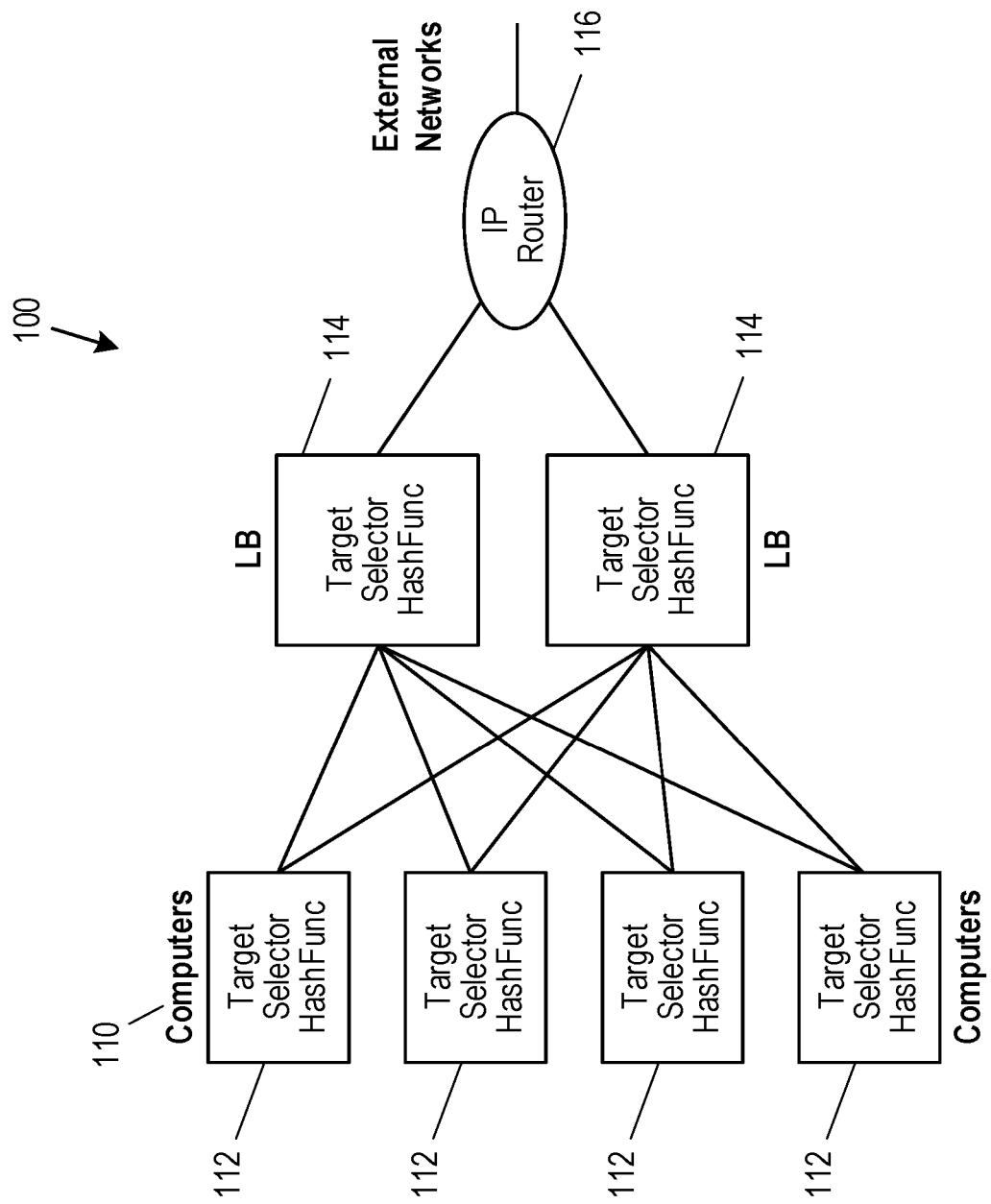
FIG. 1 shows an overview of a scenario in which a cluster of processing units is implementing a single communication network node.

It is assumed for the purposes of the methods disclosed herein that the computers (also called processing units) in the cluster use a shared Virtual IP (VIP) address as source IP address when communicating with remote nodes in the external network, and that the VIP address is formed without using Network Address Translation (NAT). FIG. 1 provides an overview of such a scenario 100, with a cluster 110 of processing units 112 implementing a single communication network node. Processing units 112 in the cluster 110 communicate via stateless load balancers 114 and an IP router 116 with external networks. Each processing unit 112 in the cluster 110 holds a record of one or more target identifiers which is/are unique within the cluster and is/are used by the load balancers 114 to identify target processing units for the distribution of packet traffic. Each processing unit holds a record of its own target identifier(s).

It is further assumed that up-to-date cluster topology information, concerning the reachability and availability of the processing units of the cluster, and the stateless server load balancers to which they are connected, is contemporaneously known to all processing units and to the stateless server load balancers in the system, for example, by means of a distributed cluster topology service. It will be appreciated that, on a bidirectional communication originating from a processing unit in the cluster, return packets from the remote node in the external network are to be distributed by the load balancers back to the connection originating computer. Additionally, on the internal network(s) between load balancers and processing units in the cluster, no use of the Address Resolution Protocol (ARP) is intended for the VIP address of the cluster. For example, the VIP address could be configured to a loop-back interface on each processing unit.

The same VIP used for outgoing connection setup from the cluster could also be used for incoming connections originating in the external network outside the cluster towards servers in the cluster. Alternatively, one or more VIP addresses may be used for outgoing connections and return traffic, and another (separate) VIP address may be used for incoming connections originating in the external network.

With respect to the bidirectional connection established according to methods of the present disclosure, it will be appreciated that the bi-directional transport layer protocols are bi-symmetrical with respect to addressing information. That is, the connection originating side's address information (i.e., for TCP the source IP address and source port-number) is carried by the transport to the remote party and then backwards reflected in the connection's return packets. For example, for a TCP outgoing connection, the values of the source IP address and source port number are reflected in the return packets in the form of destination IP address and destination port-number. That is, the value of source port-number in packets of the connection's outgoing direction is in the return packets found as the destination port-number.

For an outgoing connection some of the connection setup parameters are fixed and at least one additional parameter can be dynamically allocated. In the case of TCP, the parameter that can be dynamically allocated by the TCP protocol stack is the source port-number. According to example of the present disclosure., the processing unit implementing example methods disclosed herein will calculate and obtain the value(s) of the dynamically allocated parameter(s), and order the underlaying protocol stack (e.g. TCP stack) to set up the outgoing connection using the calculated dynamically allocated parameter(s).

In some examples of the present disclosure, each processing unit in the cluster may host a software "hash algorithm calculator", referred to as a Target Selector Hashing Function (TSHF), which is congruent with (i.e. produces the same output for the same input as) the TSHF (hash algorithm) on the load balancers, as illustrated in FIG. 1

When provided with the required fixed parameters and dynamically allocated parameter(s) for a an outgoing connection, the TSHF on a processing unit can calculate the value of the resulting target identifier that will be determined by the TSHF on the load balancer(s) for return packets of the connection. It will be appreciated that the desired result is that the value of the target identifier determined by the TSHF on the load balancer(s) is equal to one of the implementing processing unit's own target identifiers. This is the desired result because it implies that if, from this processing unit, an outgoing connection is setup with this set of connection setup parameters (fixed and dynamically allocated) now validated by the hash calculator, the return packets will be distributed back to this processing unit by the TSHF on the load balancer. This desirable property of distributing the return packets of an outgoing bidirectional connection back to its connection originating processing unit in the cluster is referred to as Distribution Coherency, and is discussed in further detail below with reference to FIG. 2.

There now follows a brief discussion of fixed and dynamically allocated parameters for the outgoing bidirectional connection. On the computer side, when receiving a request for an outgoing connection to a remote node in the external network, the received request contains explicit addressing information for the remote node. For a TCP connection this would be the destination IP address and destination port number. At this time, the layer-4 protocol type (e.g. TCP) and VIP source address value are also known and fixed. The fixed connection parameters for the bidirectional connection are therefore: the destination IP address, the destination port number, the protocol type, and the VIP source address.

The dynamically allocated parameters for the outgoing bidirectional connection are obtained according to the methods disclosed herein, and may be obtained using on-the-fly calculation mode or pre-calculated mode. The dynamically allocated connection parameters determine the distribution of the connection's return packets by the load balancer(s) and are referred to herein as dynamically allocated connection resource values, or Distribution Directing Connection Parameter Data. An example of such data, as discussed above, is the source port-number in the case of an outgoing TCP connection.

Figure 3:
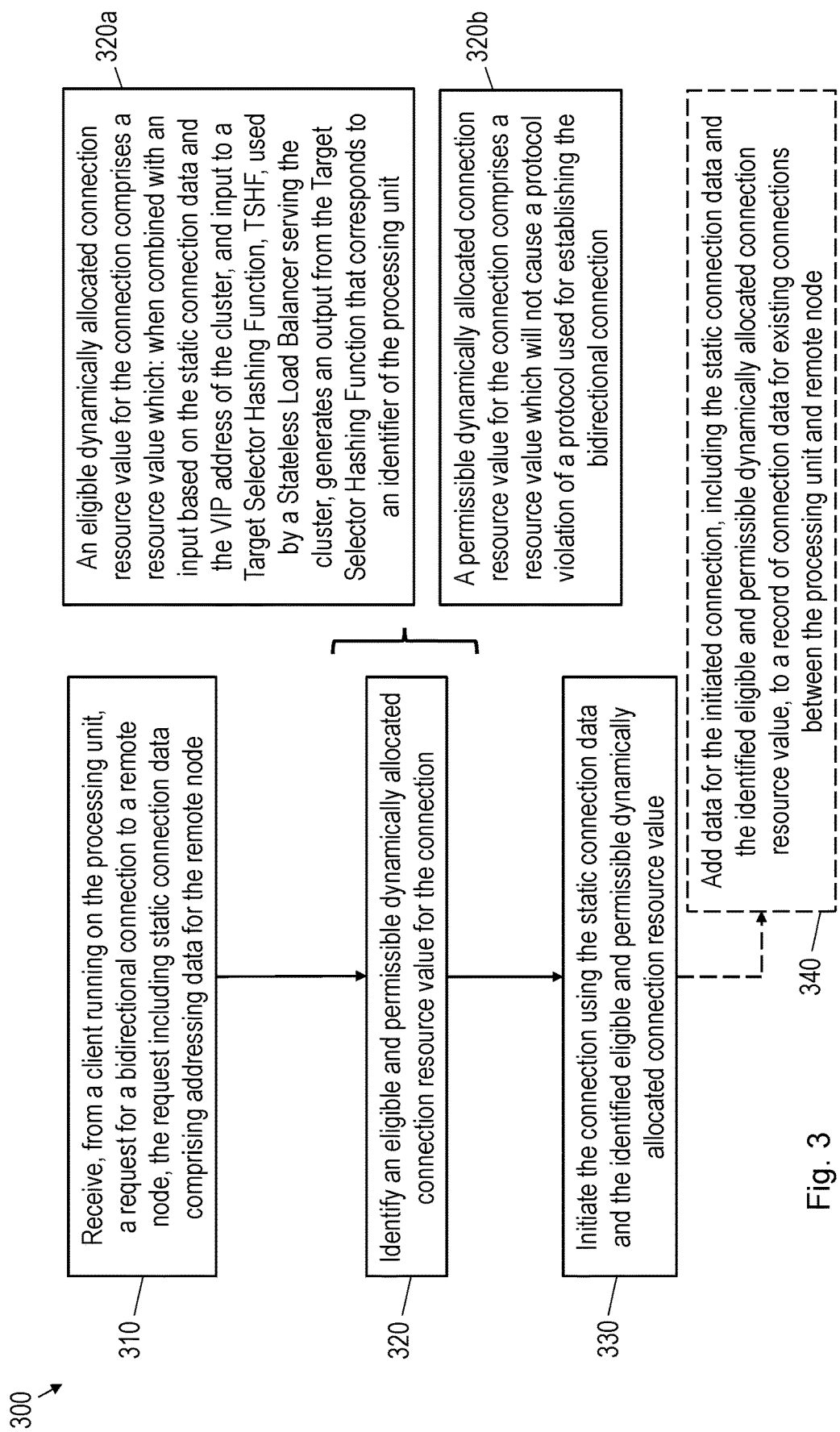
FIG. 3 is a flow chart illustrating process steps in a method method for establishing a bidirectional connection between a client and a remote node.

FIG. 3 is a flow chart illustrating process steps in a method method 300 for establishing a bidirectional connection between a client and a remote node according to examples of the present disclosure. The method 300 is performed by a processing unit that is a member of a cluster of processing units implementing clients for a communication network node, wherein each member of the cluster comprises at least one identifier that is unique within the cluster (referred to above ats the target identifier). Each member of the cluster shares the same VIP address.

Referring to FIG. 3, in a first step 310, the method comprises receiving, from a client running on the processing unit, a request for a bidirectional connection to a remote node, the request including static connection data comprising addressing data for the remote node. The method 300 then comprises, in step 320, identifying an eligible and permissible dynamically allocated connection resource value for the connection. As illustrated at 320a, an eligible dynamically allocated connection resource value for the connection comprises a resource value which, when combined with an input based on the static connection data and the VIP address of the cluster, and input to a Target Selector Hashing Function (TSHF) used by a Stateless Load Balancer serving the cluster, generates an output from the TSHF that corresponds to an identifier of the processing unit. As illustrated at 320b, a permissible dynamically allocated connection resource value for the connection comprises a resource value which will not cause a protocol violation of a protocol used for establishing the bidirectional connection. In some examples, a permissible dynamically allocated connection resource value for the connection may comprise a resource value which is not presently in use for a connection between the processing unit and the remote node. In step 330, the method 300 comprises initiating the connection using the static connection data and the identified eligible and permissible dynamically allocated connection resource value. This may for example comprise conveying the static connection data and the identified eligible and permissible dynamically allocated connection resource value to the protocol stack for establishing the connection. The method 300 thus ensures distribution coherency of outgoing bidirectional connections in combination with use of stateless load balancers to distribute traffic between computers of the cluster and without recourse to NAT.

In some examples, the method 300 may further comprise the step 340 of adding data for the initiated connection, including the static connection data and the identified eligible and permissible dynamically allocated connection resource value, to a record of connection data for existing connections between the processing unit and remote node. The method 300 may further comprise updating the record with an engagement status of the initiated connection.

It will be appreciated that, as discussed above, the bidirectional connection is a transport protocol connection, and that topology information for the cluster is available to the processing units within the cluster and to the stateless load balancer(s) serving the cluster. It will further be appreciated that, as discussed in greater detail below, an input "based on the static connection data may include the remote node addressing data (for example if only operating in on-the-fly mode), or it may include a derivative of this data in the form of an addressing data class identifier (for example if operating in pre-calculated mode or on-the-fly mode in a cluster that is also set up for pre-calculated mode). The static connection data comprises the remote node addressing data but may also comprise the transport protocol and the VIP address of the cluster, however it may be that only the remote node addressing data is included in the connection request received from the client.

The dynamically allocated connection resource may vary according to the different transport protocols with which the methods of the present disclosure may be used. For example, if used with TCP, the dynamically allocated connection resource may be the TCP source port number. If used with UDP, the dynamically allocated connection resource may be the UDP source port number.

Figure 4:
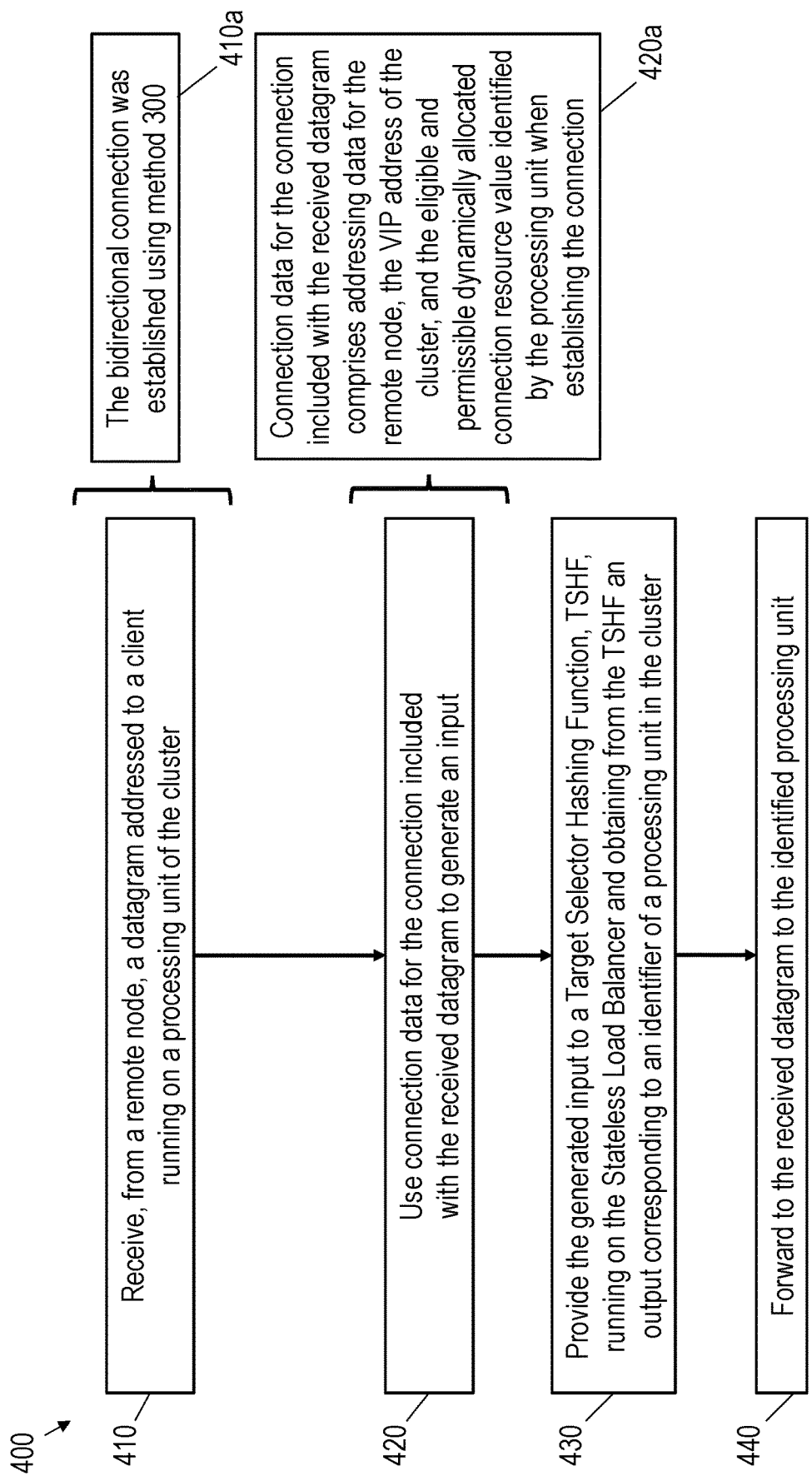
FIG. 4 is a flow chart illustrating process steps in a method for processing traffic on a bidirectional connection between a client and a remote node.

The method 300 may be complemented by a method 400 performed by a stateless load balancer serving the cluster. FIG. 4 is a flow chart illustrating process steps in a method 400 for processing traffic on a bidirectional connection between a client and a remote node. The method 400 is performed by a Stateless Load Balancer serving a cluster of processing units implementing clients for a communication network node, wherein each member of the cluster comprises at least one identifier that is unique within the cluster, and wherein each member of the cluster shares the same VIP address.

Referring to FIG. 4, the method 400 comprises, in a first step 410, receiving, from a remote node, a datagram addressed to a client running on a processing unit of the cluster. As illustrated at 410a, the bidirectional connection was established using a method according to examples of the present disclosure. The method 400 then comprises using connection data for the connection included with the received datagram to generate an input in step 420, and, in step 430, providing the generated input to a TSHF running on the Stateless Load Balancer, and obtaining from the TSHF an output corresponding to an identifier of a processing unit in the cluster. As illustrated at 420a, the connection data for the connection included with the received datagram comprises addressing data for the remote node, the VIP address of the cluster, and the eligible and permissible dynamically allocated connection resource value identified by the processing unit when establishing the connection. The method 400 further comprises forwarding to the received datagram to the identified processing unit in step 440.

Figure 5:
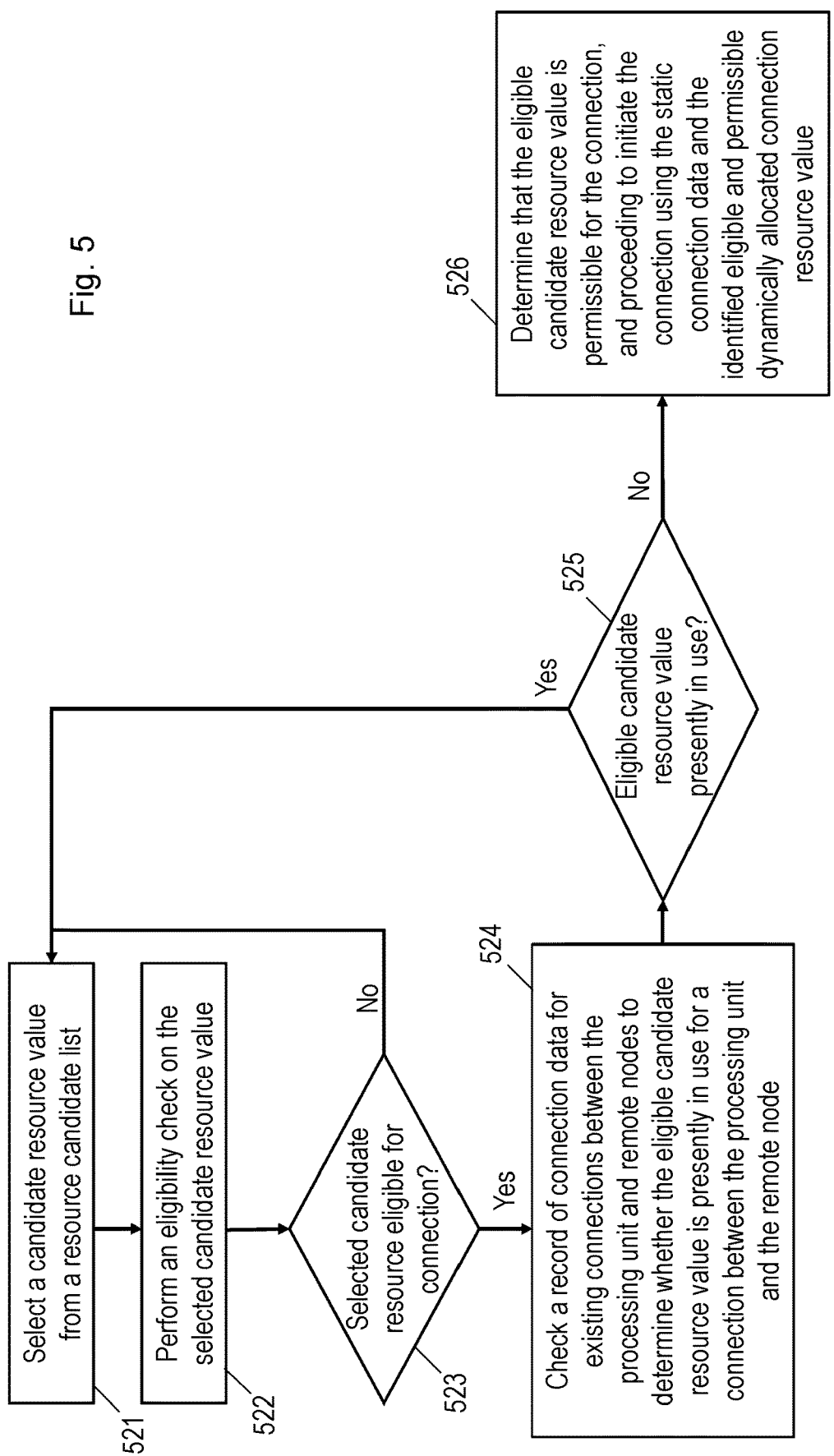
FIGS. 5 to 7d illustrate sub-steps that may be carried out by a processing unit in order to perform steps of the method of FIG. 3.
Figure 6:
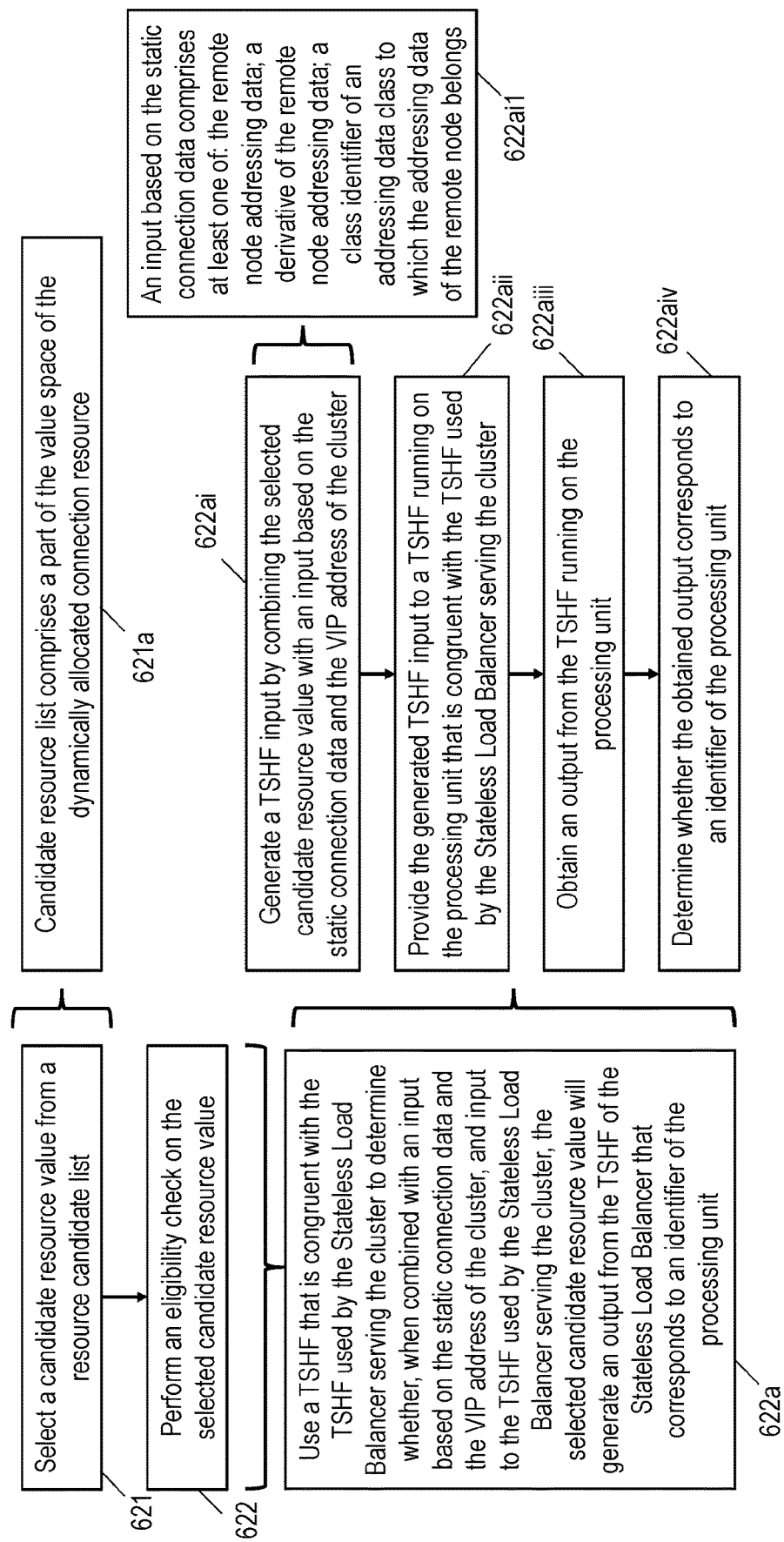

FIGS. 5 to 7 are flow charts illustrating various examples of how the steps of the method 300 may be implemented and supplemented to achieve the above discussed and additional functionality, and with reference to the different modes of operation discussed above. As discussed above with reference to the method 300, the steps illustrated in FIGS. 5 to 7 are performed by the processing unit that is performing the method 300.

FIG. 5 illustrates sub-steps that may be carried out by the processing unit in order to perform the step 320 of the method 300, regardless of the mode of operation in which the processing unit is operating (on-the-fly or pre-calculated). Step 320 comprises identifying an eligible and permissible dynamically allocated connection resource value for the connection. With reference to FIG. 5, performing step 320 may initially comprise identifying an eligible dynamically allocated connection resource value by carrying out steps 521 to 523. In step 521, the processing unit first selects a candidate resource value from a resource candidate list. Selection of candidate values may incorporate a certain degree of randomness, for example via Monte Carlo sampling, or may comprise selecting resource values sequentially from the list, or in any other manner. In step 522, the processing unit then performs an eligibility check on the selected candidate resource value. If, at step 523, the processing unit determines that the selected candidate resource value is eligible for the connection, the processing unit then proceeds to check whether the selected candidate resource value is permissible for the connection. If, at step 523, the processing unit determines that the selected candidate resource value is not eligible for the connection, the processing unit then returns to step 521 and select a new candidate resource value from the resource candidate list before performing the eligibility check of step 522 on the new selected candidate resource value.

Referring still to FIG. 5, performing step 320 may then comprise checking whether an eligible candidate resource value is permissible for the connection by carrying out steps 524 and 525. In step 524, the processing unit checks a record of connection data for existing connections between the processing unit and remote nodes, to determine permissibility, for example whether the eligible candidate resource value is presently in use for a connection between the processing unit and the remote node. If, at step 525, the processing unit determines that the eligible candidate resource value is not presently in use for a connection between the processing unit and the remote node, the processing unit proceeds to step 526, determining that the eligible candidate resource value is permissible for the connection, and proceeding to initiate the connection using the static connection data and the identified eligible and permissible dynamically allocated connection resource value. If, at step 525, the processing unit determines that the eligible candidate resource value is presently in use for a connection between the processing unit and the remote node, the processing unit determines that the eligible candidate resource value is not permissible for the connection, and returns to step 521 to identify a new eligible candidate resource value.

FIG. 6 illustrates sub-steps that may be carried out by the processing unit in order to perform the step 521 and 522 of identifying an eligible dynamically allocated connection resource value according to the on-the-fly mode of operation. With reference to FIG. 6, in order to identify an eligible dynamically allocated connection resource value in on-the-fly calculation mode, the processing unit may first select a candidate resource value from a resource candidate list in step 621. As illustrated at 621a, in on-the-fly calculation mode, the candidate resource list comprises a part of the value space of the dynamically allocated connection resource. The part may in some examples be a non-overlapping fraction of the value space that is allocated to the processing unit. For example, the total value space may be shared between all processing units of the cluster. The processing unit may then, at step 622, perform an eligibility check on the selected candidate resource value. As illustrated at 622a, performing an eligibility check on a selected candidate resource value may comprise using a TSHF that is congruent with the TSHF used by the Stateless Load Balancer serving the cluster to determine whether, when combined with an input based on the static connection data and the VIP address of the cluster, and input to the TSHF used by the Stateless Load Balancer serving the cluster, the selected candidate resource value will generate an output from the TSHF of the Stateless Load Balancer that corresponds to an identifier of the processing unit. It will be appreciated that for the purposes of the present disclosure, a TSHF that is congruent with the TSHF used by the Stateless Load Balancer serving the cluster comprises a TSHF that will generate an output that is identical to the output that would be generated by the TSHF used by the Stateless Load Balancer, when provided with the same input.

Using a TSHF that is congruent with the TSHF used by the Stateless Load Balancer serving the cluster to perform the eligibility check of step 622a may comprise carrying out the steps 622ai to 622aiv as illustrated in FIG. 6. In step 622ai, the processing unit generates a TSHF input by combining the selected candidate resource value with an input based on the static connection data and the VIP address of the cluster. As illustrated at 622ai1, an input based on the static connection data comprises at least one of the remote node addressing data, a derivative of the remote node addressing data, and/or a class identifier of an addressing data class to which the addressing data of the remote node belongs. The input to the TSHF may thus include the addressing data (for example in on-the-fly only operation) or may be the addressing data class key, as discussed in greater detail below (for example when both on-the-fly mode operation and pre-calculated mode operation are supported). With reference to the last two options in step 622ai1, it will be appreciated that the class identifier of the data class to which the addressing data of the remote node belongs may in fact be the derivative of the addressing data of the remote node (the output of a hash calculation for example). According to some examples, other elements may be present in the input (including for example the VIP address, the transport protocol, and the identified resource value).

In step 622aii, the processing unit provides the generated TSHF input to a TSHF running on the processing unit that is congruent with the TSHF used by the Stateless Load Balancer serving the cluster. In step 622aiii, the processing unit obtains an output from the TSHF running on the processing unit, and in step 622aiv, the processing unit determines whether the obtained output corresponds to an identifier of the processing unit. According to examples of the present disclosure an obtained output may "correspond to", an identifier of the processing unit by being an exact match to a processing unit identifier, or by pointing to the identifier in some way, for example via a mapping function, look-up table, or by some other implementation.

Figure 7A:
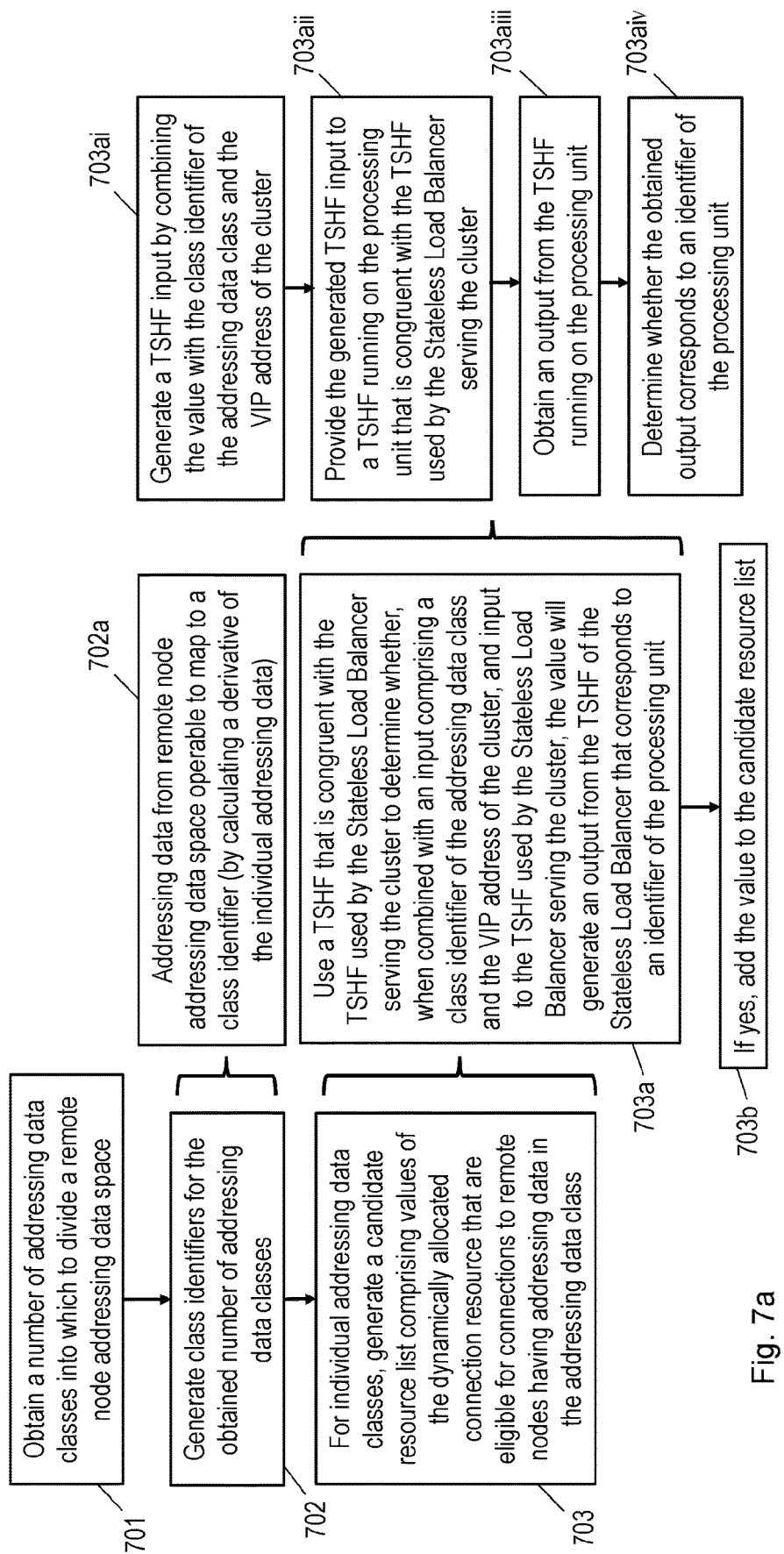

FIG. 7a illustrates steps that may be carried out by the processing unit during an initial set up phase for the pre-calculated mode of operation. The steps illustrated in FIG. 7a may for example be carried out before receiving the request for a bidirectional connection at step 310, and implement the "pre-calculation" of the pre-calculated mode of operation. Referring to FIG. 7a, in step 701, the processing unit may obtain a number of addressing data classes into which to divide a remote node addressing data space. The number of addressing data classes may be set by an operator or administrator of the system, and may be chosen to provide an optimal balance between computation complexity and granularity of division of the addressing space. In step 702, the processing unit generates class identifiers for the obtained number of addressing data classes. Each class identifier corresponds to an addressing data class, which class represents a plurality of remote nodes whose individual addressing data corresponds to that class. An example structure is illustrated in FIG. 7c, comprising 97 addressing data classes having addressing data class identifiers (referred to in the Figure as RPDC-keys) from 0 to 96. Each class is associated with a list which may be populated with candidate resource values, as discussed below. Referring again to FIG. 7a, and as illustrated at 702, the class identifiers are generated such that individual addressing data from the remote node addressing data space is operable to map to a generated addressing data class identifier. This mapping may be performed by the processing unit at a later step of the method, once a connection request, specifying addressing data for the remote node concerned, is received (see for example the discussion of step 720a below). As illustrated at 702a, and discussed below with reference to step 720a, the individual addressing data from the remote node addressing data space may be operable to map to a generated addressing data class identifier by calculating a derivative of the individual addressing data using the obtained number of addressing data classes, wherein the calculated derivative comprises the class identifier of the addressing data class to which the individual addressing data is mapped. The derivative may be a hash function. In this manner, data from the remote node addressing data space may be operable to be mapped to a specific one of the addressing data classes, such that each individual addressing data in the space is operable to map, via the calculated derivative, to a specific addressing data class. As mentioned above, this mapping may be performed by the processing unit for individual addressing data of remote nodes when a connection request specifying such data is received (see for example step 720a below). In step 703, the processing unit then, for individual addressing data classes, generates a candidate resource list comprising values of the dynamically allocated connection resource that are eligible for connections to remote nodes having addressing data in the addressing data class.

In order to carry out the step 703 of generating a candidate resource list for individual addressing data classes, the processing unit may initially, in step 703a, for values sampled from the value space of the dynamically allocated connection resource, use a TSHF that is congruent with the TSHF used by the Stateless Load Balancer serving the cluster to determine whether, when combined with an input comprising a class identifier of the addressing data class and the VIP address of the cluster, and input to the TSHF used by the Stateless Load Balancer serving the cluster, the value will generate an output from the TSHF of the Stateless Load Balancer that corresponds to an identifier of the processing unit. If the value under consideration, referred to below as a candidate value, will generate an output from the TSHF of the Stateless Load Balancer that corresponds to an identifier of the processing unit, then the processing unit adds the candidate value to the candidate resource list at step 703b. As discussed above, a TSHF that is congruent with the TSHF used by the Stateless Load Balancer serving the cluster comprises a TSHF that will generate an output that is identical to the output that would be generated by the TSHF used by the Stateless Load Balancer, when provided with the same input. It will be appreciated that the candidate values sampled from the value space of the dynamically allocated connection resource, and for which step 703a is performed, may be sampled from a specific part of the value space of the resource, for example a part of the value space allocated to the processing unit.

In some examples, the step 703a of using a TSHF that is congruent with the TSHF used by the Stateless Load Balancer serving the cluster to determine whether, when combined with an input comprising a class identifier of the addressing data class and the VIP address of the cluster, and input to the TSHF used by the Stateless Load Balancer serving the cluster, a candidate value will generate an output from the TSHF of the Stateless Load Balancer that corresponds to an identifier of the processing unit, may be carried out by performing steps 703ai to 703aiv.

In step 703ai, the processing unit generates a TSHF input by combining the candidate value with the class identifier of the addressing data class and the VIP address of the cluster. The processing unit then provides the generated TSHF input to a TSHF running on the processing unit that is congruent with the TSHF used by the Stateless Load Balancer serving the cluster in step 703aii. In step 703aiii, the processing unit obtains an output from the TSHF running on the processing unit, before, in step 703aiv, determining whether the obtained output corresponds to an identifier of the processing unit.

In some examples, the processing unit may update the generated candidate resource lists, for example following on-the-fly checking and/or following a change in the topology of the cluster and/or following a change relating to the remote nodes with which the cluster communicates.

Figure 7B:
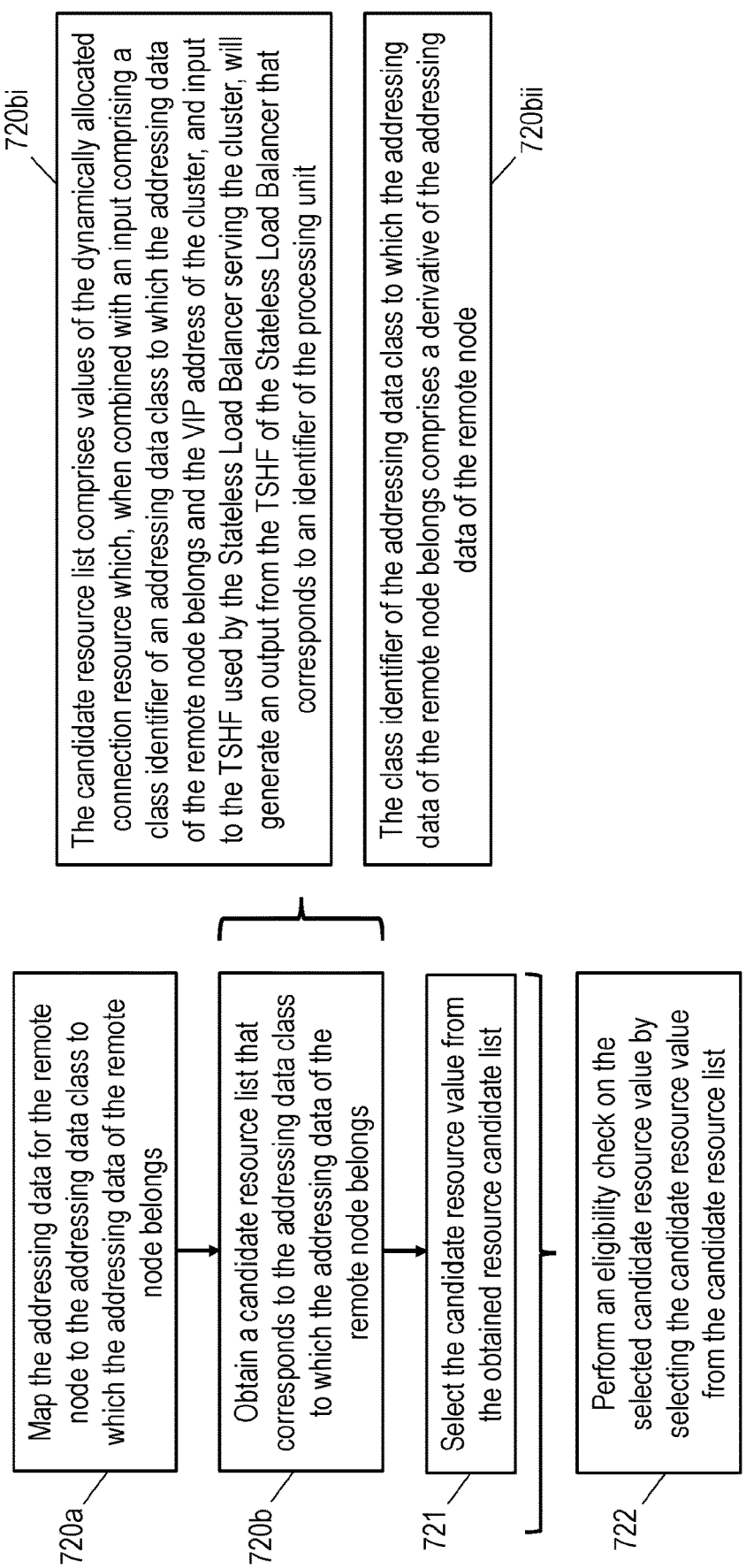
Figure 7C:
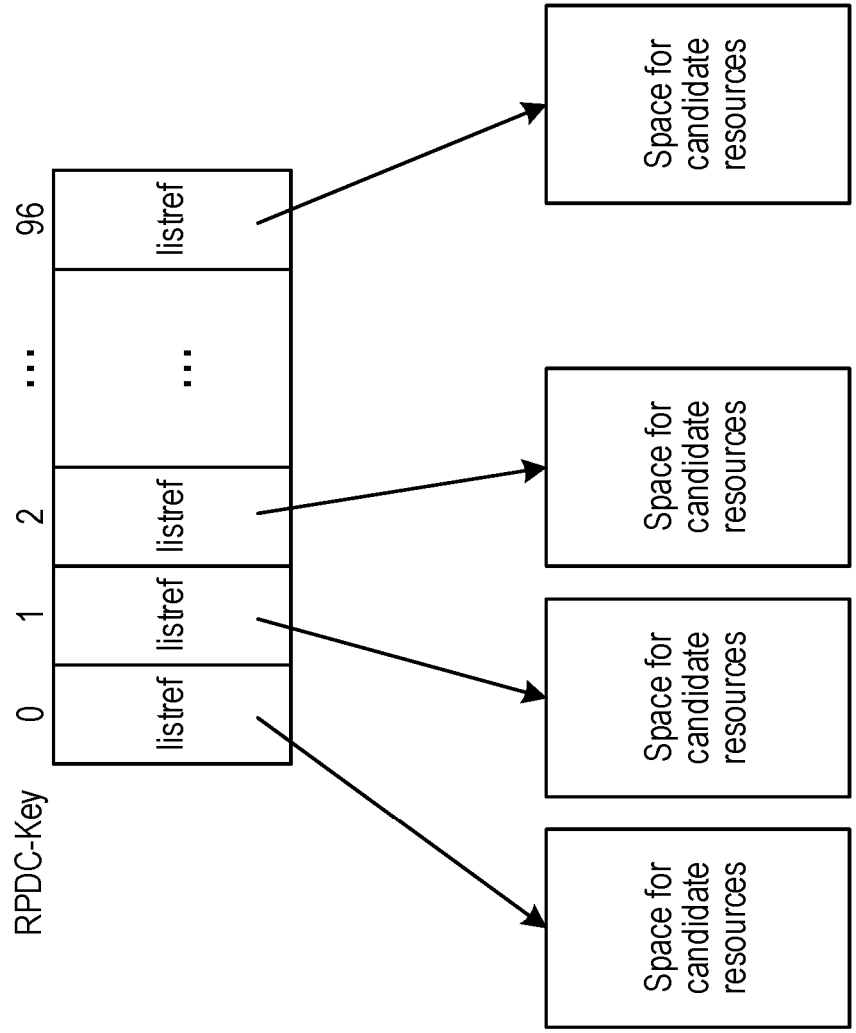
Figure 7D:
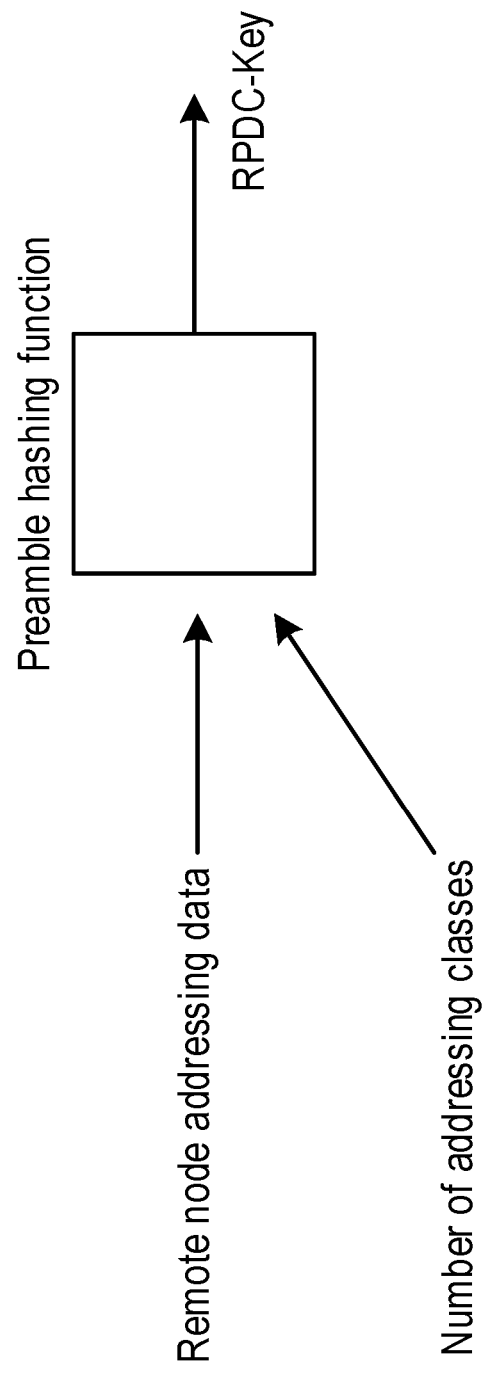

FIG. 7b illustrates sub-steps that may be carried out by the processing unit in order to perform the steps 521 and 522 of identifying an eligible dynamically allocated connection resource value according to the pre-calculated mode of operation. With reference to FIG. 7b, in order to identify an eligible dynamically allocated connection resource value in pre-calculated mode, the processing unit may first map the addressing data for the remote node to the addressing data class to which the addressing data of the remote node belongs in step 720a. This may for example comprise calculating a derivative of the addressing data using the number of addressing data classes, in order to generate an outcome that corresponds to the class identifier of the addressing data class to which the addressing data belongs. As discussed above, the derivative may be a hash function, and the calculation of a derivative is referred to in some implementations discussed below as performing a preamble hash. As illustrated in FIG. 7d, the inputs to the preamble hashing function are the remote node addressing data and the number of addressing data classes, and the output form the preamble hashing function is the class identifier of the addressing data class to which the addressing data of the remote node belongs. In this manner, the individual addressing data for the remote node that is specified in the connection request may be mapped to the specific addressing data class to which the addressing data of the remote node belongs. Referring again to FIG. 7b, in step 720b, the processing unit may then obtain a candidate resource list that corresponds to the addressing data class to which the addressing data of the remote node belongs. As illustrated at 720bi, the candidate resource list may comprise values of the dynamically allocated connection resource which, when combined with an input comprising a class identifier of an addressing data class to which the addressing data of the remote node belongs and the VIP address of the cluster, and input to the TSHF used by the Stateless Load Balancer serving the cluster, will generate an output from the TSHF of the Stateless Load Balancer that corresponds to an identifier of the processing unit. This list may have been populated by the processing unit in step 703 discussed above, and as discussed above and illustrated at 720bii, the class identifier of the addressing data class to which the addressing data of the remote node belongs comprises a derivative of the addressing data of the remote node. In step 721, the processing unit selects the candidate resource value from the obtained resource candidate list. It will be appreciated that the candidate resource list for the relevant addressing data class has already been populated by the processing node to comprise values of the dynamically allocated connection resource that are eligible for connections to remote nodes having addressing data in a class to which the addressing data of the remote node belongs. Consequently, as illustrated at 722, selecting the candidate resource value from the candidate resource list implicitly involves performing an eligibility check on a selected candidate resource value, as only eligible candidate resource values are present in the list.

Figure 8:
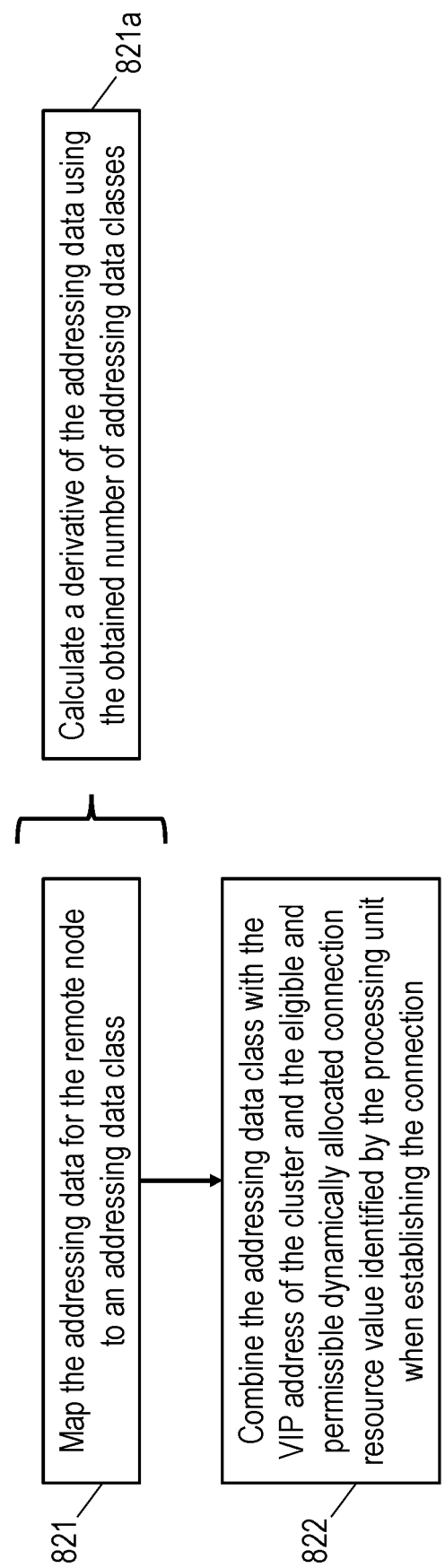
FIG. 8 illustrates sub-steps that may be carried out by a stateless load balancer in order to perform steps of the method of FIG. 4.

FIG. 8 illustrates sub-steps that may be carried out by the Stateless Load Balancer in order to perform the step 420 of using connection data for the connection included with the received datagram to generate an input in step 420. The steps of FIG. 8 may be performed by the stateless load balancer when the processing unit is functioning in the pre-calculated mode of operation, or when the processing unit is operable to function in either the pre-calculated mode of operation or the on-the-fly mode of operation. With reference to FIG. 7b, in order to use connection data for the connection included with the received datagram to generate an input in step 420, the Stateless Load Balancer may first, in step 821, map the addressing data for the remote node to an addressing data class, and then, in step 822, combine the addressing data class with the VIP address of the cluster and the eligible and permissible dynamically allocated connection resource value identified by the processing unit when establishing the connection. The input generated in this manner may then be provided by the Stateless Load Balancer to its TSHF in step 430, as discussed below with reference to FIG. 4.

As illustrated at step 821a, mapping the addressing data for the remote node to an addressing data class may comprise calculating a derivative of the addressing data using the obtained number of addressing data classes, wherein the calculated derivative comprises or corresponds to the class identifier of the addressing data class to which the individual addressing data is mapped.

As discussed above, the method 300, as elaborated in FIGS. 3, 5, 6, 7a and 7b, is performed by a processing unit, and the method 400, as elaborated in FIGS. 4 and 8, is performed by a Stateless Load Balancer. The present disclosure provides a processing unit and a Stateless Load Balancer that are adapted to perform any or all of the steps of the above discussed methods.

Figure 9:
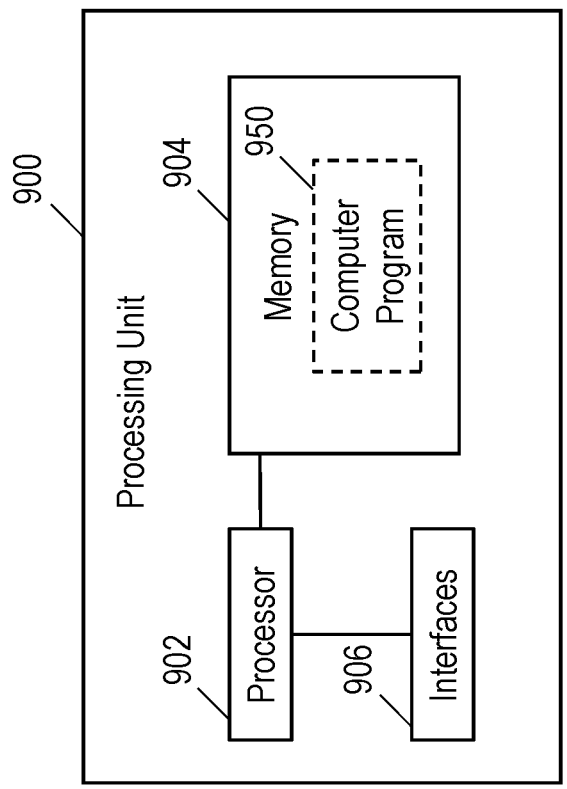

FIG. 9 is a block diagram illustrating an example processing unit 900 which may implement the method 300 according to examples of the present disclosure, for example on receipt of suitable instructions from a computer program 950. Referring to FIG. 9, the processing unit 900 comprises a processor or processing circuitry 902, and may comprise a memory 904 and interfaces 906. The processing circuitry 902 is operable to perform some or all of the steps of the method 300 as discussed above with reference to FIGS. 3, 5, 6, 7a and 7b. The memory 904 may contain instructions executable by the processing circuitry 902 such that the processing unit 900 is operable to perform some or all of the steps of the method 300. The instructions may also include instructions for executing one or more telecommunications and/or data communications protocols. The instructions may be stored in the form of the computer program 950. In some examples, the processor or processing circuitry 902 may include one or more microprocessors or microcontrollers, as well as other digital hardware, which may include digital signal processors (DSPs), special-purpose digital logic, etc.

The processor or processing circuitry 902 may be implemented by any type of integrated circuit, such as an Application Specific Integrated Circuit (ASIC), Field Programmable Gate Array (FPGA) etc. The memory 904 may include one or several types of memory suitable for the processor, such as read-only memory (ROM), random-access memory, cache memory, flash memory devices, optical storage devices, solid state disk, hard disk drive etc. The processing unit 900 may further comprise interfaces suitable for communicating with a stateless load balancer and for communicating with other processing units or communication network nodes, according to appropriate communication protocols.

Figure 10:
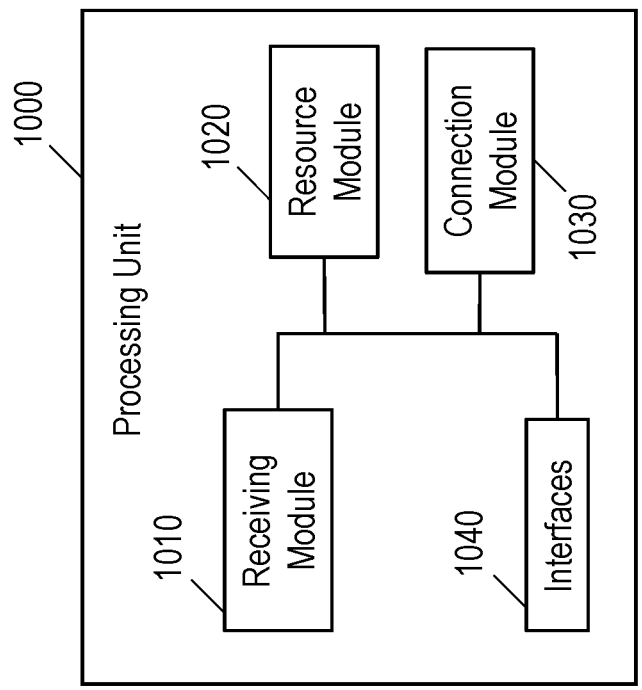
FIGS. 9 and 10 are block diagrams illustrating functional modules in examples of a processing unit.

FIG. 10 illustrates functional modules in another example of processing unit 1000 which may execute examples of the method 300 of the present disclosure, for example according to computer readable instructions received from a computer program. It will be understood that the modules illustrated in FIG. 10 are functional modules, and may be realised in any appropriate combination of hardware and/or software. The modules may comprise one or more processors and may be integrated to any degree.

Referring to FIG. 10, the processing unit 1000 is for establishing a bidirectional connection between a client and a remote node, and is a member of a cluster of processing units implementing clients for a communication network node, wherein each member of the cluster comprises at least one identifier that is unique within the cluster, and wherein each member of the cluster shares the same Virtual Internet Protocol, VIP, address, The processing unit comprises a receiving module 1010 receiving, from a client running on the processing unit, a request for a bidirectional connection to a remote node, the request including static connection data comprising addressing data for the remote node. The processing unit further comprises a resource module 1220 for identifying an eligible and permissible dynamically allocated connection resource value for the connection, and a connection module 1030 for initiating the connection using the static connection data and the identified eligible and permissible dynamically allocated connection resource value. An eligible dynamically allocated connection resource value for the connection comprises a resource value which, when combined with an input based on the static connection data and the VIP address of the cluster, and input to a Target Selector Hashing Function, TSHF, used by a Stateless Load Balancer serving the cluster, generates an output from the Target Selector Hashing Function that corresponds to an identifier of the processing unit. A permissible dynamically allocated connection resource value for the connection comprises a resource value which will not cause a protocol violation of a protocol used for establishing the bidirectional connection. The processing unit may further comprise interfaces 1040 for communicating with a stateless load balancer and for communicating with other processing units or communication network nodes, according to appropriate communication protocols.

Figure 11:
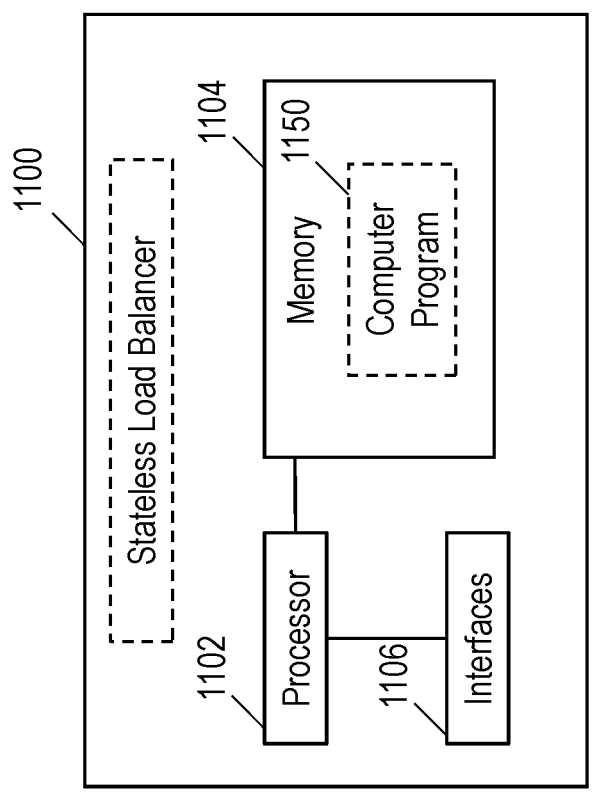

FIG. 11 is a block diagram illustrating an example stateless load balancer 1100 which may implement the method 400 according to examples of the present disclosure, for example on receipt of suitable instructions from a computer program 1150. Referring to FIG. 11, the stateless load balancer 1100 comprises a processor or processing circuitry 1102, and may comprise a memory 1104 and interfaces 1106. The processing circuitry 1102 is operable to perform some or all of the steps of the method 400 as discussed above with reference to FIGS. 4 and 8. The memory 1104 may contain instructions executable by the processing circuitry 1102 such that the stateless load balancer 1100 is operable to perform some or all of the steps of the method 400. The instructions may also include instructions for executing one or more telecommunications and/or data communications protocols. The instructions may be stored in the form of the computer program 1150. In some examples, the processor or processing circuitry 1102 may include one or more microprocessors or microcontrollers, as well as other digital hardware, which may include digital signal processors (DSPs), special-purpose digital logic, etc. The processor or processing circuitry 1102 may be implemented by any type of integrated circuit, such as an Application Specific Integrated Circuit (ASIC), Field Programmable Gate Array (FPGA) etc. The memory 1104 may include one or several types of memory suitable for the processor, such as read-only memory (ROM), random-access memory, cache memory, flash memory devices, optical storage devices, solid state disk, hard disk drive etc. The stateless load balancer 1100 may further comprise interfaces suitable for communicating with one or more processing units according to appropriate communication protocols.

Figure 12:
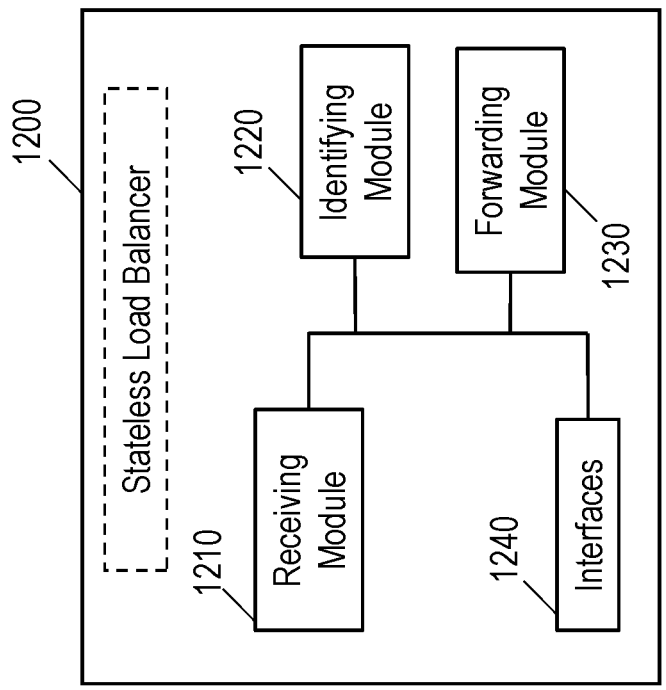
FIGS. 11 and 12 are block diagrams illustrating functional modules in examples of a stateless load balancer.

FIG. 12 illustrates functional modules in another example of stateless load balancer 1200 which may execute examples of the method 400 of the present disclosure, for example according to computer readable instructions received from a computer program. It will be understood that the modules illustrated in FIG. 12 are functional modules, and may be realised in any appropriate combination of hardware and/or software. The modules may comprise one or more processors and may be integrated to any degree.

Referring to FIG. 12, stateless load balancer 1200 is for processing traffic on a bidirectional connection between a client and a remote node, and for serving a cluster of processing units implementing clients for a communication network node, wherein each member of the cluster comprises at least one identifier that is unique within the cluster, and wherein each member of the cluster shares the same Virtual Internet Protocol, VIP, address. The stateless load balancer 1200 comprises a receiving module 1210 for receiving, from a remote node, a datagram addressed to a client running on a processing unit of the cluster. The stateless load balancer 1200 further comprises an identifying module 1220 for using connection data for the connection included with the received datagram to generate an input, and for providing the generated input to a Target Selector Hashing Function, TSHF, running on the Stateless Load Balancer and obtaining from the TSHF an output corresponding to an identifier of a processing unit in the cluster. The stateless load balancer 1200 further comprises a forwarding module 1230 for forwarding the received datagram to the identified processing unit. The bidirectional connection was established using a method according to the present disclosure, and the connection data for the connection included with the received datagram comprises addressing data for the remote node, the VIP address of the cluster, and the eligible and permissible dynamically allocated connection resource value identified by the processing unit when establishing the connection. The stateless load balancer 1200 may further comprise interfaces 1240 suitable for communicating with processing units and an IP router according to appropriate communication protocols.

The methods 300 and 400, as discussed above with reference to FIGS. 3 to 8, illustrate how processing unit and stateless load balancer may cooperate to ensure distribution coherency for datagrams exchanged over a bidirectional connection between a processing unit of a cluster of processing units sharing a VIP and a remote node. There now follows a discussion of a range of different implementation detail that may be encompassed within the above described methods. The detail presented below encompasses how the various method steps may be implemented by the processing unit and stateless load balancer, and presentation of example deployment scenarios for the methods of the present disclosure.

As discussed above with reference to FIG. 1, examples of the present disclosure may be used in connection with a cluster of processing units, illustrated as "computers", that share a VIP. The cluster is connected to a set of stateless server load balancers (two in the Figure) which are further connected to an external network through an intermediary IP Router. Stateless load balancers typically comprise a TSHF, as illustrated in FIG. 1. For implementation of methods according to the present disclosure, a TSHF is also present on each compute, or processing unit. The TSHF on the processing units are congruent with the TSHF on the stateless load balancers, meaning that all the TSHFs produce the same output when provided with the same input. In a communication network model, a core network system is often deployed on a computer cluster using a load balancing system for distributing the return traffic arriving from remote parties in an external internet that interconnects core network nodes.

Also as discussed above, according to aspects of the present disclosure, the TSHF on each computer receiving traffic from the stateless server load balancers may be used to verify a choice of a candidate source port number (or value for another dynamic ally allocated connection resource) before that number is selected by a computer being engaged in the process of setting up a bi-directional transport protocol connection using a cluster-wise pre-configured collective VIP address as source IP address. The source VIP address is used as a common source IP address serving a plurality of connections originating from the same computer cluster. The purpose of the verification is to ensure eligible and permissible connection parameters for a given cluster topology using a collective VIP address as a source IP address in all the outbound IP packets pertaining to a connection. In this manner, a common source IP address may be simultaneously used by a plurality of cluster originating outbound connections towards remote parties in the external network in such a way that return packets of the outbound connection arriving at the stateless server load balancers are distributed to the computer (also referred to as a processing unit) from which the outbound connection originated. Furthermore, together with an accurate topology service, the validation step protects against cluster-wide impermissible connection parameter mismatches and duplicated hashing coherence ambiguities.

Figure 2:
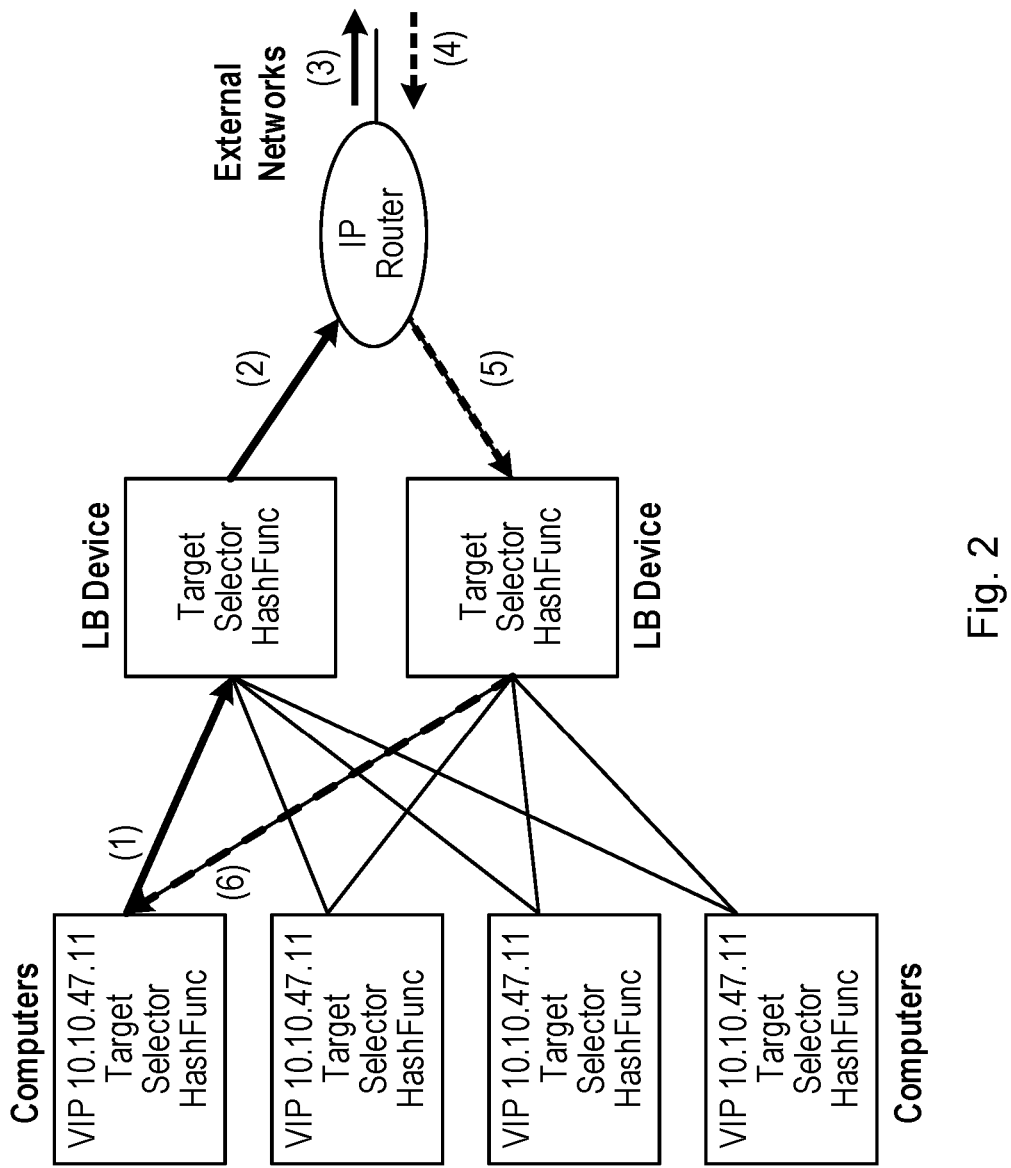
FIG. 2 shows an example of maintained Distribution Coherency with reference to the scenario of FIG. 1.

FIG. 2 shows an example of maintained Distribution Coherency, that is the return packets of an outbound transport layer bi-directional connection are here shown to be distributed back to the connection originating party on the top computer illustrated in the cluster. This distribution coherency is maintained, as illustrated in the Figure, irrespective of which stateless load balancer the return packets arrive at in their passage from the IP Router that faces the external network. In order to ensure the distribution coherency shown in the FIG. 2, an eligible dynamically allocated connection resource value is chosen by the connection originating computer according to examples of the present disclosure. In the case of a TCP connection, this value is a connection source port-number.

With reference to FIG. 2, in a first step (1) a first computer sends to one of the stateless load balancers (illustrated as LB devices), an egress IP packet with a source IP address, VIP 10.10.47.11 that is shared by the computer cluster and a source port number that is associated with a first transport layer bi-directional connection destined for a remote party in the external network and that is both eligible and permissible.

Packet out (from computer) information includes (address info): Destination IP address, destination port number, protocol type, VIP source address, eligible and permissible source port-number.

When the packet arrives, for example on the first LB Device, after inspecting the arriving packet the LB Device determines, through a lookup in its own routing table (on the LB device), that this packet should be forwarded to the next-hop IP address indicated in the routing table. In the illustrated scenario, the next-hop IP address is associated with an interface on the IP Router. The LB Device therefore sends the packet to the IP Router in step 2, and the IP Router sends the packet to the destination remote party in the external network in step 3.

Packet out: Destination IP address, destination port number, protocol type, VIP source address, eligible and permissible source port-number.

In step 4, a return IP packet associated with the transport layer bi-directional connection and sent by the remote party in the external network arrives at the IP Router. In the return packet, the source and destination IP addresses and port numbers are reversed:

Return packet from external network to the IP Router address info: Destination VIP address, eligible and permissible destination port-number, protocol type, source IP address, source port number.

In step 5, the IP Router looks up its routing table and determines that for the Destination VIP address in the return packet there are two equally good next-hop addresses to which the return packet may be forwarded: one for each LB Device. The IP Router makes an Equal Cost Multi Paths (ECMP) choice and sends the packet to the second LB Device.

In step 6, the second LB Device first recognizes the Destination IP address in the return packet to be a configured VIP address and then uses its TSHF to find the identifier of the destination computer. The second LB device then sends the return packet to the connection originating first computer.

Figure 13:
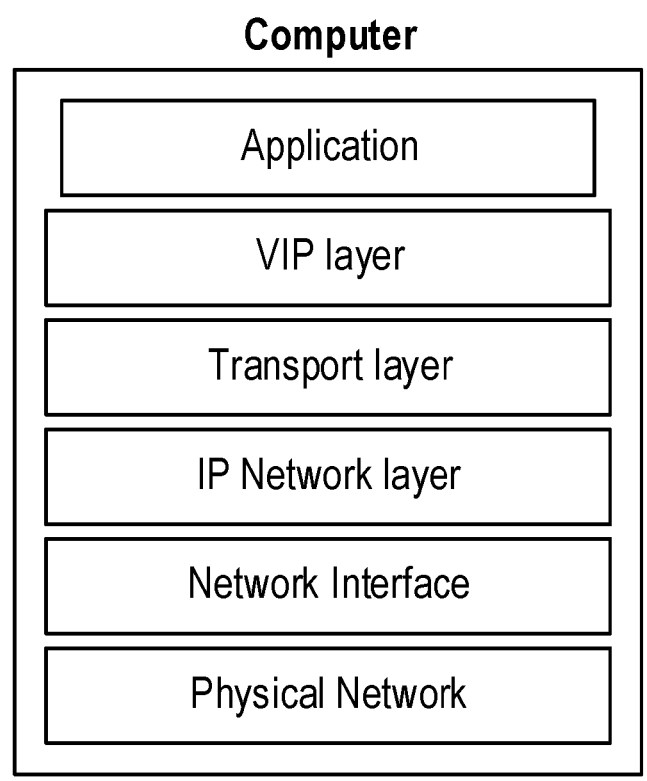
FIG. 13 illustrates the structural placement of an introduced VIP orchestration layer.

FIG. 13 illustrates the structural placement of an introduced VIP orchestration layer which can be regarded as an intermediary extension of the application layer. This is the layer at which the Target Selector Hash Function (TSHF) and other elements performing methods according to the present disclosure may be implemented in one example realization.

Figure 14:
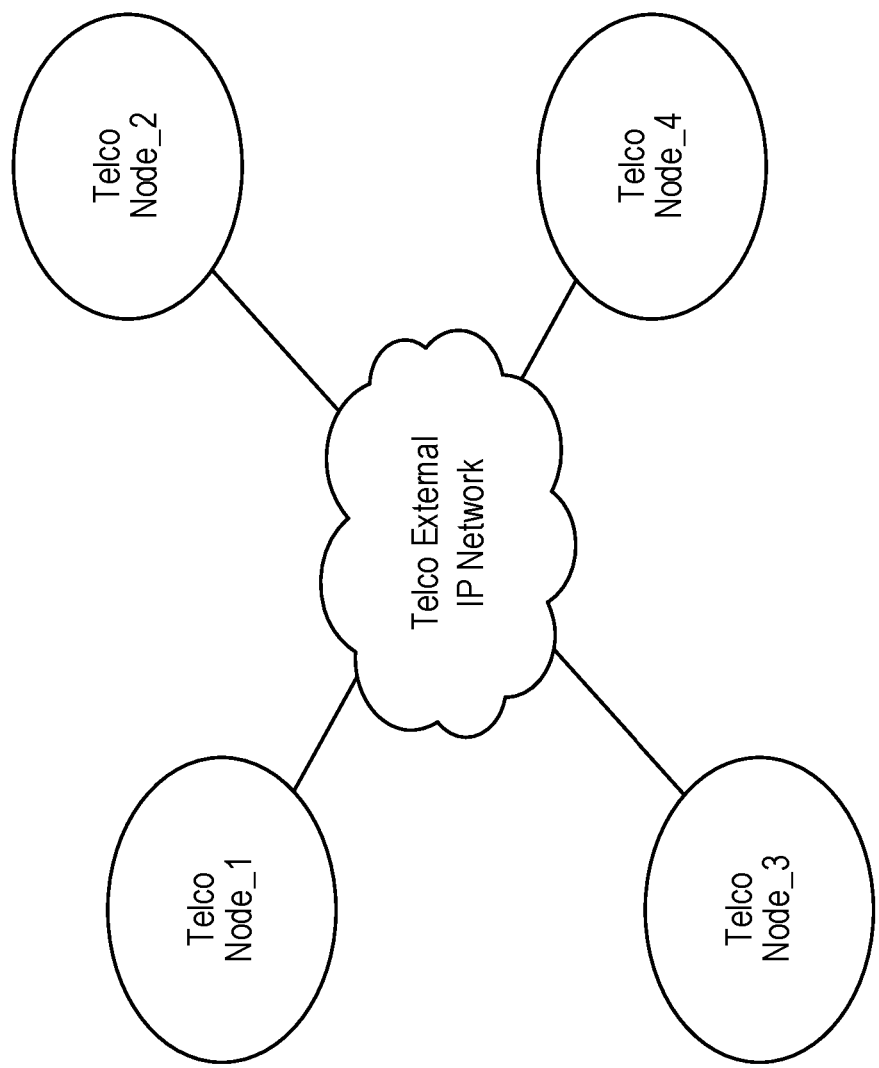
FIG. 14 is an example of a simplified communication network comprising four communication network nodes.

FIG. 14 is an example of a simplified communication network comprising four communication network nodes (illustrated as "Telco nodes"), each connected over a telco external internet. Each Telco node is implemented by a computer cluster comprising a plurality of processing units (computers) connected internally over an IP internal network and, through an intermediary set of load balancers and gateway routers, arranged to face the other telco nodes over the illustrated external IP network.

Figure 15:
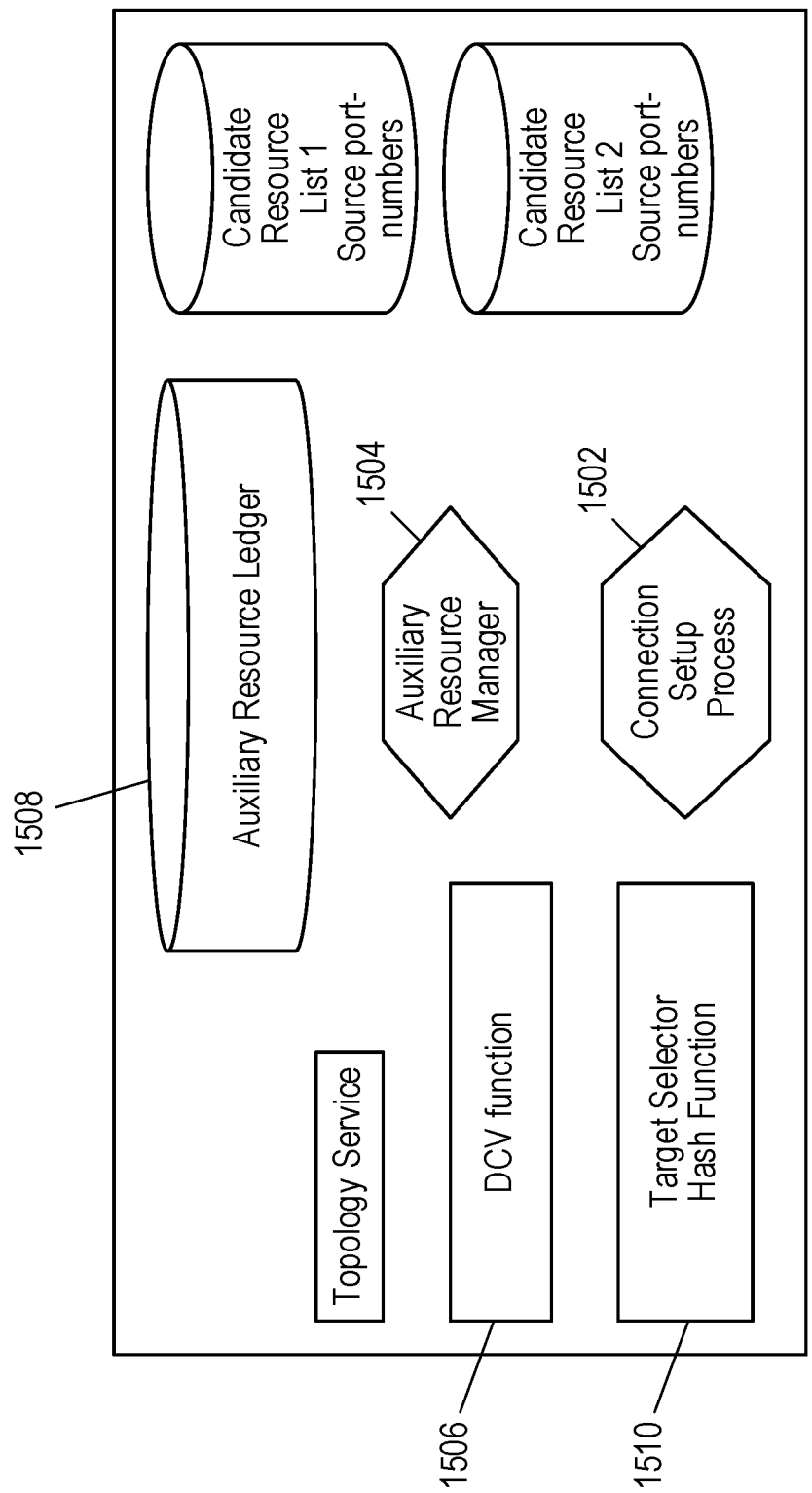
FIG. 15 is a block diagram illustrating architectural elements in one example implementation of the method of FIG. 3.

FIG. 15 is a block diagram illustrating architectural elements in one example implementation of the methods disclosed herein. The figure shows, as processes with separate tasks, a Connection Setup Process 1502, and an Auxiliary Resource Manager 1504.

In one example implementation, the Connection Setup Process 1502, upon reception of a connection request from an application, enables the setup of distribution coherent bidirectional transport connections when the connection request is associated with a VIP address representing the computer cluster. The Auxiliary Resource Manager 1504 is a background process which continuously inspects the information in Candidate Resource lists. With the help of the Distribution Coherence Validation (DCV) function 1506, the Auxiliary Resource Manager 1504 periodically verifies that its contents are both consistent and up to date, with respect to rules governing each Candidate Resource list and affiliated data structures, and with respect to current topology information and resource usage information available in the Auxiliary Resource Ledger 1508, to achieve an automatic best effort up-to-date upkeep of candidate information in each Candidate Resource list.

It will be appreciated that for a hash process designed for a deterministic low key-reshuffle impact during topology alterations (such as consistent hashing for example), and considering the pre-calculated mode of operation, only a known fraction of the candidates in prearranged resource candidate lists would need to be replaced with new updated pre-validated candidate resources in the event of a changed topology. The implementation of candidate list rearrangements would use the TSHF 1510 for pre validating replacement candidate resources.

As discussed above, method according to the present disclosure may make use of each computer in the cluster hosting a software TSHF. This calculator can, for a given set of transport layer connection parameters calculate a resulting "target node ID" value. On a computer it is therefore possible to probe a set of given connection parameters to see if the relevant hash calculation of connection parameters matches the computer's own target node ID. The hash calculators on the computer side are congruent with the hash algorithm of the Load Balancers. This means that a result obtained by a hash algorithm calculator on a computer is identical to what the hash algorithm on the load balancers will produce for the same set of given input parameters. Using the hash algorithm calculators on the computers, it becomes possible to anticipate, for example, the distribution behavior of the load balancers with respect to TCP or other transport protocols and a prospective return packet, if the hash calculator is given the return packet's destination IP address, destination port-number, source IP address and source port number.

In the on-the-fly mode of operation, on the computer side, the process setting up the connection uses a software routine to obtain, by an example method disclosed herein, a hash algorithm calculator selected dynamically allocated connection resource value. This value (also referred to herein as a Distribution Directing Connection Parameter Data) forms at least one parameter among a set of connection setup parameters, together with a VIP source IP address, and is conveyed to the transport layer protocol stack on the computer for setting up the outgoing layer-4 connection. For example, in the case of a TCP outgoing connection, this value would be a source port-number.

In on-the-fly calculation mode, after receiving a connection request on a computer, a software routine will on-the fly, and in any order, pick a candidate parameter value from a preconfigured resource candidate list, organized per source VIP address, and validate the candidate value in a validation step that uses a hashing algorithm which is congruent with the properties of the hashing algorithm used on the stateless load balancing and forwarding device. The resource candidate list could for example, for the TCP protocol, cover the full so-called ephemeral source port-number range of port-numbers 1024-65535. Alternatively, the ephemeral source port-number range could be subdivided into a collection of purpose specific smaller resource candidate lists indicating a set of number resources.

The number resources from resource candidate list may be checked by the Distribution Coherency Validation (DCV) function by software on the computer-side to determine if a number on the list, when given as a parameter together with other connection setup parameters, would, under permissible circumstances for such a connection setup, lead the load balancers to distribute the return packet traffic to the originating computer for this hypothetical outgoing connection.

If this validation step fails, a new candidate parameter may be selected from the resource candidate list and subjected to a repeated procedure. When a positive Distribution Coherency Validation (DCV) result is obtained for a candidate value, then this value can be regarded as an eligible candidate value for use as a resource parameter for the corresponding Distribution Directing Connection Parameter Data in the connection setup procedure. The eligible parameter is then checked to see if it is a permissible parameter, wherein an impermissible parameter would lead to protocol violation.

An eligible candidate value implies that when used as Distribution Directing Connection Parameter Data in the outgoing connection setup procedure on a computer, the value would direct the load balancers to distribute the return packets of the connection back to the computer that originated the outgoing connection. That is, with an eligible candidate value, Distribution Coherency is achieved. However, this eligible candidate value may still not be a good choice for other reasons. For example, the value may already be in use in some other way that means a protocol violation would be caused. For example, an eligible candidate value is impermissible for use in a new outgoing connection if the same eligible candidate value is already in use with another connection to the same remote party (for example the same destination IP address and remote-port number). This situation is impermissible in the same way that for an ordinary PC two web browsers must not have the same TCP source port number when connected to a web server (TCP protocol rule). In such cases, the computer should seek to identify a different eligible candidate value and check again for permissibility.

Using the on-the-fly calculation mode of the methods proposed herein implies that at some point in time after the connection request is received, a permissibility check should be done, at least once, to ensure that an eligible candidate value from a resource candidate list is permissible to use as a Distribution Directing Connection Parameter Data value, before finally ordering the undelaying transport protocol stack to set up the outgoing connection. Book-keeping of all connection setups on the computers can enable computers to test the permissibility of each eligible candidate value. If an eligible candidate value is impermissible, that is the permissibility test fails, a new candidate value from a candidate resource list is probed until an eligible and permissible candidate value is found. The logical entity for connection book-keeping in the example architecture of FIG. 15 is referred to as the Auxiliary Resource Ledger (ARL) 1508.

The ARL could be based on the TCP stack's own connection information in a very simple implementation. However, for the case of outgoing bidirectional UDP Pseudo Sessions, an ARL function is preferable within the computer (processing unit|) carrying out the example methods according to the present disclosure.

The desired result is that for an outgoing connection setup with an eligible and permissible value as a Distribution Directing Connection Parameter Data value, the arriving return packets, with the VIP address as destination IP address, should as a result of the hashing taking place on the load balancers, be distributed back to the point in the cluster from where the connection was originally setup (the computer originating the connection). The order in which candidate resources are selected from the resource candidate list can be determined according to individual implementations. In one example practice, the repeated probing procedure pick from the resource candidate list may be implemented with some measure of randomness. This type of approach is sometimes referred to as a type of Monte Carlo probing scheme.

For an outbound TCP connection with a source VIP address, the candidate resource would be a TCP source port-number. Thus, the preprepared resource candidate list would contain a collection of TCP source port-numbers to pick from for the source VIP address in question. The methods disclosed herein are not limited to TCP but can be used for any bidirectional transport layer connection scheme, for example UDP pseudo sessions, in which case the candidate resource would be the UDP source por number.

An eligible resource candidate value is impermissible for use in an outgoing connection as Distribution Directing Connection Parameter Data if the same resource value is already in use with another connection to the same remote party (for example with TCP, the same remote IP address and remote-port number). In the case of the on-the-fly calculated mode of operation, the remote party's remote destination IP address and remote port-number comes with the connection request that invokes the on-the-fly calculation process to acquire the Distribution Directing Connection Parameter Data for setting up the outgoing connection. Therefore, when the on-the-fly mode is used, the remote party's IP address and port-number are known a priori, and a permissibility check can be performed on an eligible resource candidate value, for example by checking in the ARL that the eligible candidate resource is not already connected to the same remote IP address and port-number as those provided with the connection request.

With the on-the-fly mode of operation it is fully conceivable that the same eligible resource candidate value can be permissible towards two different remote parties with different IP addresses. This implies that the Distribution Directing Connection Parameter Data (for example, a TCP source-port number) can be reused towards different remote parties with different remote IP addresses or remote port-numbers.

With the on-the-fly mode, the permissibility checking of a resource candidate with respect to remote party address information makes reuse of Distribution Directing Connection Parameter Data possible. This possibility for resource reuse could, for example alleviate or avoid situations of TCP source port exhaustion during situations of high connection volume traffic load in clusters with many computers.

The support for reuse of Distribution Directing Connection Parameter Data values (for example, TCP source port-number) is helpful as this is a finite resource that can be exhausted with an increasing number of outgoing connections and increasing number of computers. However, permissibility checking is a prerequisite for the reuse of Distribution Directing Connection Parameter Data values, as this is a protection against protocol violations. It will be appreciated that the implementation of permissibility checking of a Distribution Directing Connection Parameter Data value as described for the on-the-fly mode of operation requires that the Remote Party's addressing information (with TCP, remote IP address and remote port number) is known. Connection requests from client software are typically dynamic events, and the addressing data of a remote party is generally first specified in the connection request. In on-the-fly operation, the Remote Party's addressing information (with TCP, remote IP address and remote port number) is known as it is received with the connection request, before the calculation process starts to obtain an eligible candidate resource value that can be permissibility checked. However, with the pre-calculated mode of operation, the calculation process to obtain an eligible candidate resource value is performed before any connection request has been received. At this time, before a connection request has been received, the Remote Party's addressing information (with TCP, remote IP address and remote port number) is unknown.

When using the pre-calculated mode of operation, examples of the present disclosure address this problem of the remote party addressing data being unavailable by using addressing data classes. The pre-calculated mode results in a quicker connection setup as eligible Distribution Directing Connection Parameter Data values have been pre-calculated in advance. The pre-calculated mode of operation is consequently particularly useful during periods of stable network topography.

On the computer side, when a software client contextually associated with a source VIP address makes a connection request to a remote party, this comes with information about the Remote Party's addressing data (for example for a TCP outgoing connection, remote IP address and remote port number). In pre-calculated mode operation, the Remote Party's addressing information is hashed into a fixed number of addressing data classes, also referred to herein as Remote Party Data Classes (RPDC) where each class has an own class identifier, referred to as RPDC-key.

One example hashing process may be as follows: ((binary: remote IP address) XOR (binary remote port number) Modulo 97))+1, which would result in an RPDC-key (addressing data class identifier) value in the range of 1 . . . 97.

In one example provided for illustration, for some given remote IP address and remote port number the resulting RPDC-key value (addressing data class identifier) is 13. RPDC-13 points to its own list of precalculated eligible Directing Connection Parameter Data values (for example, with TCP a list of eligible source port numbers). These values are eligible for the connection in this example, with the source VIP address of the computer that generated the list, and are ready to pick from and further check in ARL if the source port number value is free create an entry in the ARL. If the source port number is not free, another source port number can be selected from the RPDC-13 list. This process is illustrated in greater detail in process flow 1b below.

The value 97 in the example is a prime number (for a better spread over class), but a larger prime number can be chosen can be chosen, for example 997, if deemed necessary for a finer class granularity. In the example an offset of 1 was added for pedagogical reasons, but bigger number offsets would be more typical in real deployments.

Figure 16:
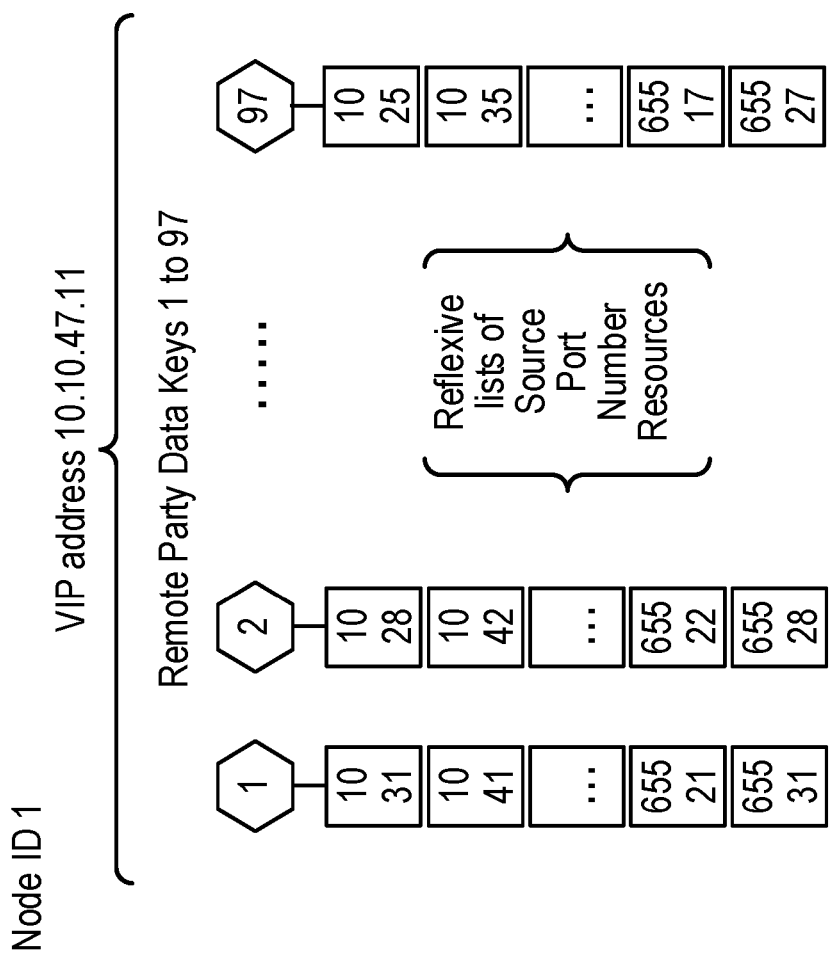
FIGS. 16 and 17 illustrate extracts of candidate resource lists for a first computer node and a tenth computer node in a cluster expandable to ten computers.
Figure 17:
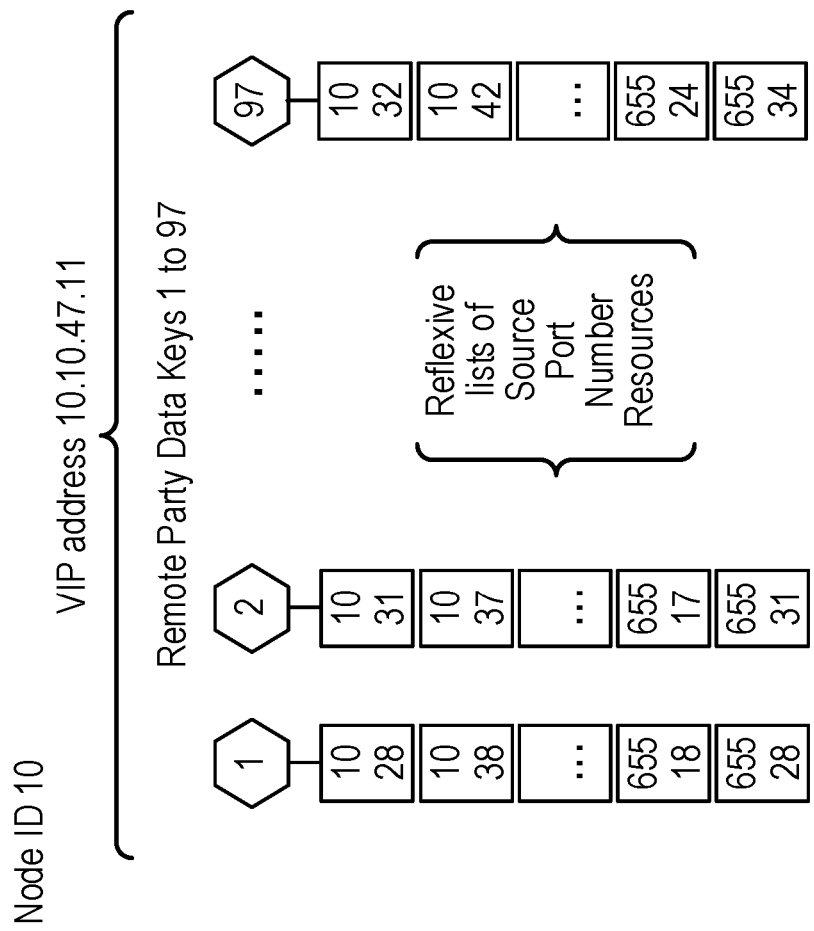

FIGS. 16 and 17 illustrate extracts of candidate resource lists for a 1st. computer node and a 10th computer node in a cluster expandable to 10 computers. FIGS. 16 and 17 illustrate the principle of a preprocessed, addressing class expanded, resource candidate list structure of eligible candidate resources to achieve a more rapid selection of resources drawn from among a set of candidate resources. In the example of FIGS. 16 and 17, the RPDC class-expanded resource set is pre-expanded by the prime number factor 97. A prime number is chosen to achieve a well distributed RPDC result in the preamble primary hashing step (the initial mapping of individual addressing data to addressing data class). Each RPDC-key holds a reflexive list of Source Port Number Resources. In this example, with a computer cluster expandable to 10 computers, the list structure on each computer holds a non-overlapping tenth of the ephemeral port range, which is reuse pre-expanded by a factor of (97−1)=96. It will be appreciated that, for example, the same resource 1031 is used both for (Node_ID_1, RPDC-key_1) and (Node_ID_, 10, RPDC-key_2). Similarly, the same resource 1028 is used for both (Node_ID_1, RPDC-key_2) and (Node_10, RPDC_key_1).

Figure 18:
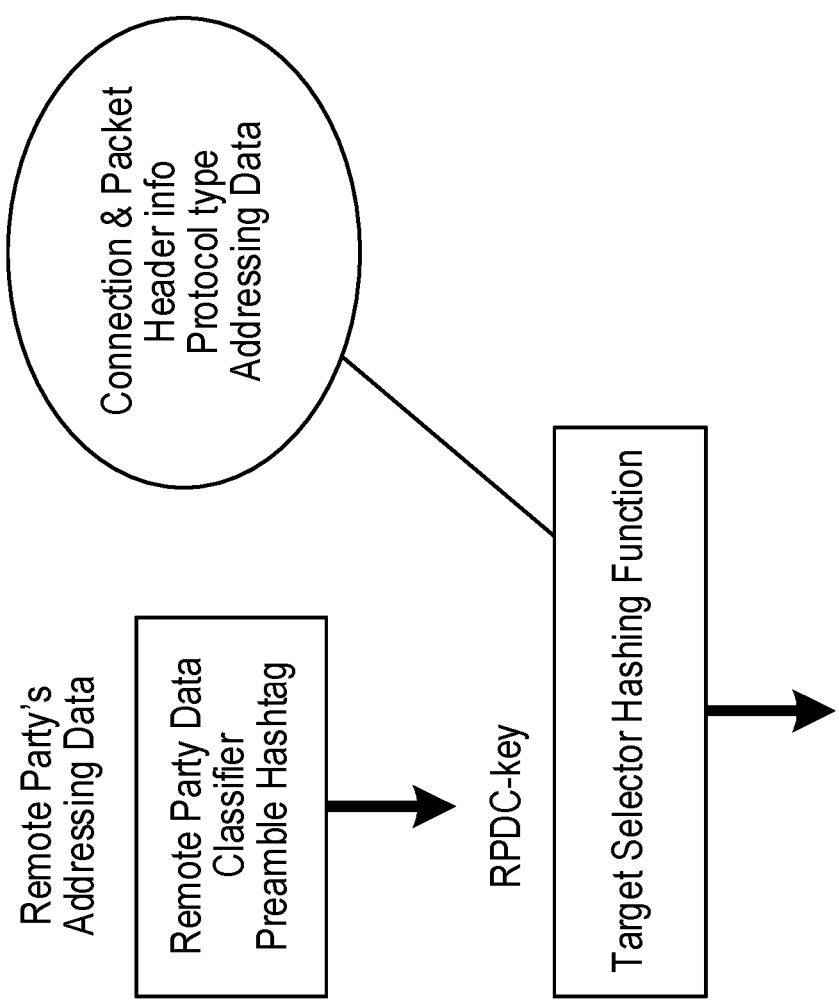
FIG. 18 illustrates how a Remote Party's Addressing Data may be classified.

FIG. 18 illustrates how a Remote Party's Addressing Data (for example, remote IP address and remote port-number) is classified, and the resulting RPDC-key provided as argument with other data to a Target Selector Hashing Function that may be implemented on both Stateless Load Balancers and target computers of the cluster.

It will be appreciated that in order to support the pre-calculated mode of operation, the TSHF (hashing algorithms) on both the computers (processing units) and stateless load balancers can be augmented with an extra preamble hashing step as illustrated in FIG. 18.

On the computer side, the preamble hash algorithm to map individual addressing data to addressing data class (RPDC-key) can be as earlier described: ((binary: remote IP address) XOR (binary remote port number) Modulo 97))+1, which would result in an RPDC-key value in the range of 1 . . . 97.

The output of the preamble hashing will be an RPDC-key value (addressing data class identifier). This class identifier is provided to the TSHF in place of the individual addressing data as illustrated in FIG. 18.

On the load balancer side: the same preamble hash algorithm to map individual addressing data to addressing data class (RPDC-key) can be used ((binary: remote IP address) XOR (binary remote port number)) Modulo 97))+1), which would result in an RPDC-key value in the range of 1 . . . 97.

In order to populate the lists for each addressing data class, on the computer side, the following process may be implemented, as illustrated in process 1a below:

At system initialization:
1. obtain VIP address and the fixed number of remote party data class individuals.//(e.g. preconfigured prime number value).
2. for each Remote Party Data Class and Source VIP address
   create a reflexive port list structure;
   populate the list by looping through a set of resource candidates//(e.g. port 1024-65535)
   on each port-number, run the DCV function to ensure that return packets are distributed correctly (check eligibility)
   if DCV generates a hit, (hash calculator result corresponds to own target node ID), put the port-number in RPDC corresponding list.

It will be appreciated that both the on-the fly-mode and precalculated mode can be used in the same system. However, the preamble hashing to addressing data classes that is used in the pre-calculated mode of operation will then also be used on computers and load balancers during on-the-fly mode operation.

Figure 19A:
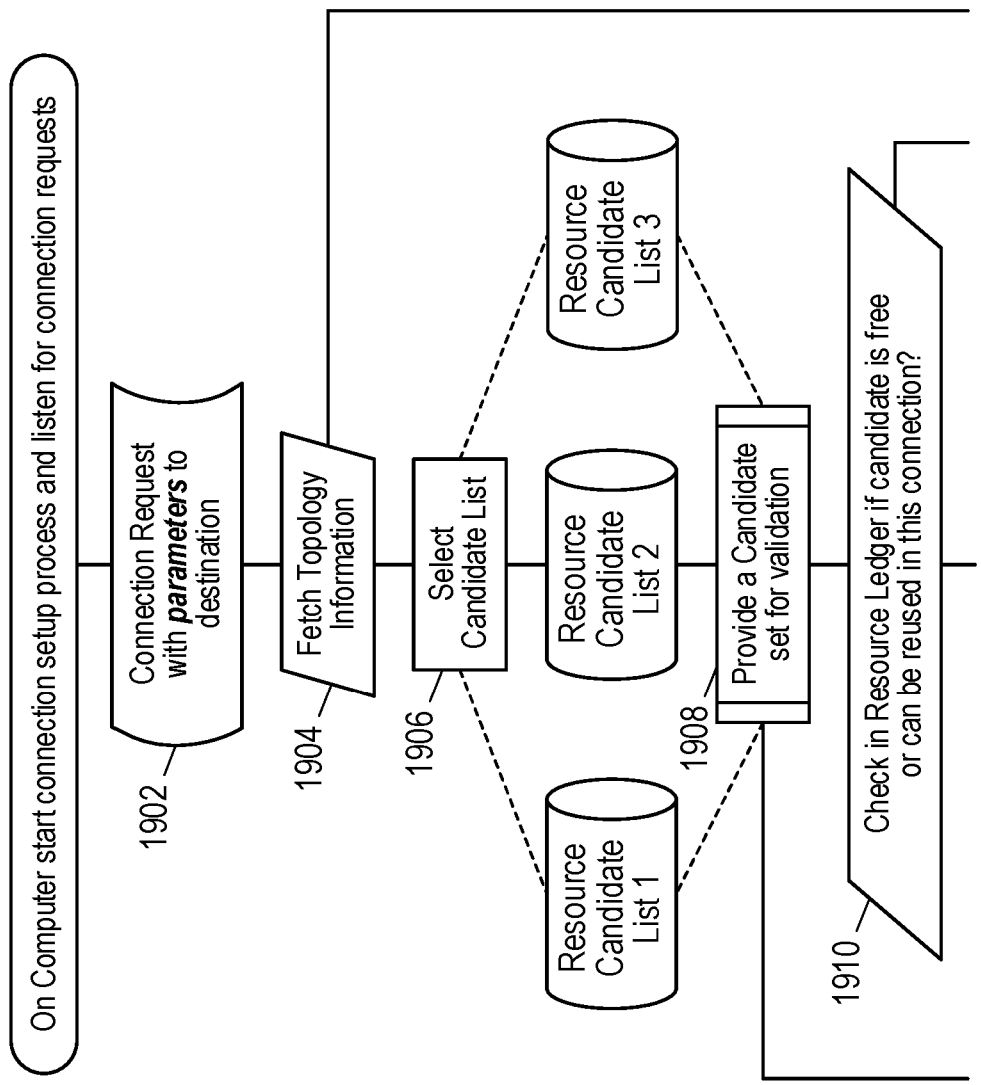
FIGS. 19A and 19B are flow charts illustrating an example implementation of the method of FIG. 3.
Figure 19B:
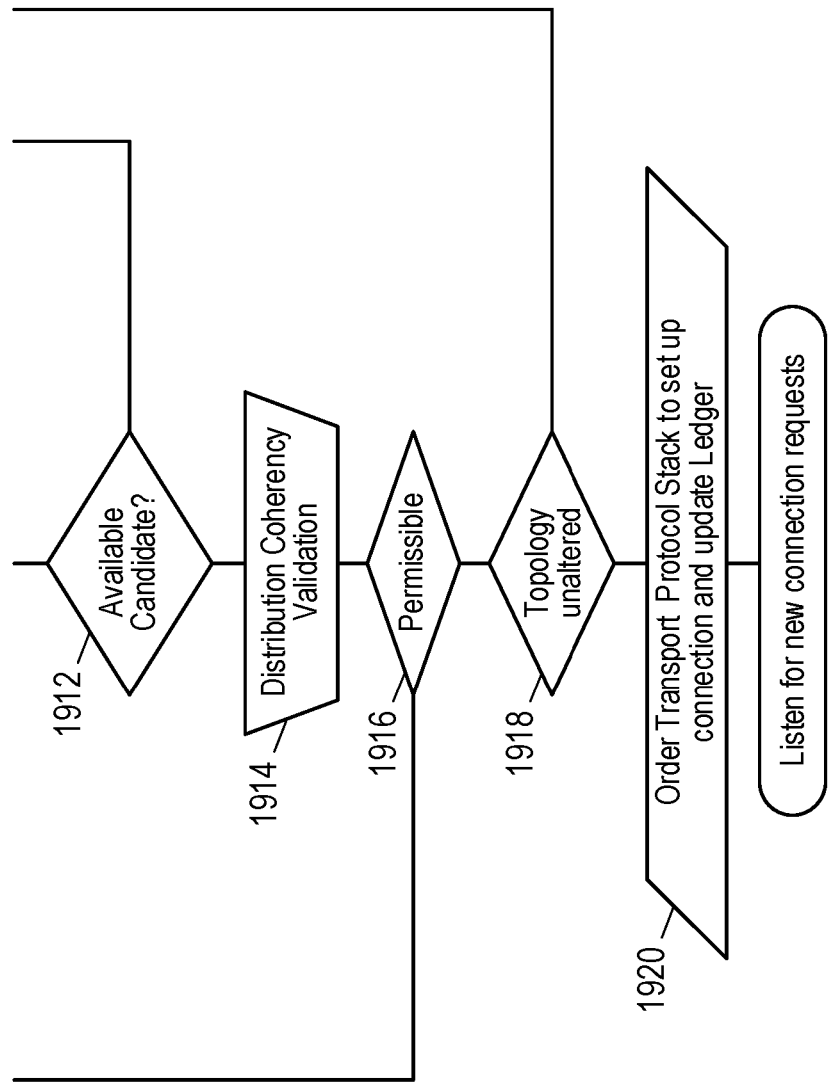

FIG. 19 is a flow chart illustrating an example implementation of method 300. In the illustrated example process, the permissibility check is performed before the eligibility check, although it will be appreciated that this order may be reversed, with eligibility being checked before permissibility. With reference to FIG. 19:

A request is received for a bidirectional connection from a VIP address, with parameters including a destination IP address, transport protocol type, and destination port-number (1902).

Current Topology information is then fetched, this information reflecting which computers and load balancer devices are available for distribution and reception of traffic (1904).

One of the prearranged candidate resource lists is then selected. The selection can be based on the VIP address and other connection parameters, topology information or a combination thereof (1906).

For the VIP address in question at least one candidate resource, for example a source port-number is obtained from the selected candidate resource list. In some examples a short list of candidates may be obtained from the candidate resource list as opposed to a single candidate (1908).

By means of the auxiliary resource ledger, it is checked if this single candidate is free, or in some examples one of the short-listed candidate resources is free (permissibility check) (1910).

If a free candidate resource is found (1912), it is provided to the next step Distribution Coherency Validation (1914). If no free candidate resource is found (1912), then the ledger is used to check whether the engaged candidate resource (or any of the engaged short-listed candidates) can be assumed to safely be reused for the prospective connection. For example, if the engaged resource is a source port-number and in the auxiliary resource ledger all destination IP addresses registered in conjunction with this engaged resource are different from the IP destination address in the connection parameters of the current connection request, it can be assumed safe to reuse in the new connection. An assumed safe reuse of a candidate can then be provided to the next-step Distribution Coherency Validation (1912).

Eligibility of the permissible resource is then checked at the Distribution Coherence Validation (1914).

If the candidate resource is validated by Distribution Coherency Validation (1916), then, after a check that the topology remains unaltered (1918), the transport layer stack is subsequently ordered to set up the requested bidirectional connection for the Source VIP address, with the "permissible candidate resource" and the other connection parameters in question (1920).

If the Coherency Validation step result turns out to be negative (1916), that is this candidate choice is ineligible, a new candidate (alternatively a new short list of candidates, depending on embodiment of the invention) can be obtained from the selected Resource Candidate list (1908) and the process is repeated until a permissible and eligible candidate resource is found and finally a connection is setup.

If the topology information has been altered (1918) then the Fetch Topology Information routine (1904) is invoked again, followed by a new selection of Candidate list etc.

Process 1a,b,c set out below shows a pseudo code description example implementation of the methods 300, 400:

Process 1a
 On Computer Side. Preprocessing work (For example, tasks of the Auxiliary Resource Manager).
 At system initialization:
  1. obtain VIP address and the fixed number of remote party data class individuals.//(e.g. preconfigured value).
  2. for each Remote Party Data Class and Source VIP address
   create a reflexive port list structure;
   populate the list by looping from admin_set_port_low to admin_set_port_hi, on each port-number run the DCV function.
 If DCV generates a hit, put the port-number in port corresponding list.
Process 1b
 On Computer Side. (For example, task of the Connection Setup Process)
 Operation:
  1. on a connection request.
   calculate Remote Party Data Class key, by applying an algorithm on all the remote parameters in the request.
   select reflexive port list according to calculated key.
   for each port-number in list
    check with the ALR that the session is not in use.
    if not in use. create an initial entry in the ALR and leave loop with selected port number.
  2. send request to transport protocol layer with selected candidate source port-number and other parameters.
Process 1c
 On Load Balancer Devices
  1. on received reply packet
   calculate Remote Party Data Class key by applying an algorithm to the remote parameters in the packet header.
   combine remote data class key with local header data, (in this direction) dest port and dest addr, apply similar algorithm as DCV, use the obtained target node id for forwarding purposes.

Examples of the present disclosure thus provide NAT free methods for ensuring distribution coherency on a bidirectional transport layer connection from a processing unit in a processing unit cluster using the same VIP address. The methods are for use with stateless load balancers, allowing for a simpler server load balancer redundancy solution without need for implementing any state replication protocol.

Examples of the present disclosure enable lower development costs and lower maintenance costs owing to the simpler nature of testing and troubleshooting efforts than is achievable with comparable stateful server load balancing solutions.

When establishing the outbound transport protocol connections, a verbatim copy of a cluster configured Virtual IP (VIP) address may be used as the source IP address in the IP packet headers of all the departing IP packets of the outbound connection. The VIP address may be taken from a range of IP addresses which are permissible to use for the routing of IP packets in the external network. Several outbound connections from the cluster can use the same VIP address as source IP address. This VIP address, when presented in the IP packet headers of outbound connections as a source IP address, collectively represents a set of connection originating parties in the cluster. The individuals of this set of connection originating parties are typically spread out on different computers inside the computer cluster where methods according to the present disclosure may be implemented.

In some examples of the present disclosure, a set of functionally equal, stateless server load balancers may be used to receive traffic from the external network and algorithmically distribute datagrams relating to this traffic based on information in the IP datagram packet headers. On each of the equal stateless server load balancers, after the inspection of an arriving IP packet's header indicates the destination IP address of the packet as a pre-configured VIP address, a load balancer internal function; the target selector hashing function, is called upon this IP packet. The target selector hashing function uses as input parameters information in the IP packet header and the number of available distribution computers, and then calculates a distinct distribution target identifier associated with one of the computers in the cluster. A forwarding function on the load balancers forwards the packet to one of the computers based on the target selector calculated distribution target node identity.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for establishing a bidirectional connection between a client and a remote node, the method performed by a processing unit that is a member of a cluster of processing units implementing clients for a communication network node, wherein each member of the cluster comprises at least one identifier that is unique within the cluster, and wherein each member of the cluster shares the same Virtual Internet Protocol, VIP, address, the method comprising:

receiving, from a client running on the processing unit, a request for a bidirectional connection to a remote node, the request including static connection data comprising addressing data for the remote node;

identifying an eligible and permissible dynamically allocated connection resource value for the connection; and initiating the connection using the static connection data and the identified eligible and permissible dynamically allocated connection resource value;

wherein an eligible dynamically allocated connection resource value for the connection comprises a resource value which:

when combined with an input based on the static connection data and the VIP address of the cluster, and input to a Target Selector Hashing Function, TSHF, used by a Stateless Load Balancer serving the cluster, generates an output from the Target Selector Hashing Function that corresponds to an identifier of the processing unit;

and wherein a permissible dynamically allocated connection resource value for the connection comprises a resource value which:

will not cause a protocol violation of a protocol used for establishing the bidirectional connection.

2. A method as claimed in claim 1, wherein identifying an eligible and permissible dynamically allocated connection resource value for the connection comprises identifying an eligible dynamically allocated connection resource value by:

selecting a candidate resource value from a resource candidate list;

performing an eligibility check on the selected candidate resource value; and if the selected candidate resource value is eligible for the connection, proceeding to check whether the selected candidate resource value is permissible for the connection.

3. A method as claimed in claim 2, wherein identifying an eligible dynamically allocated connection resource value further comprises:

if the selected candidate resource value is not eligible for the connection, selecting a new candidate resource value from the resource candidate list; and performing the eligibility check on the new selected candidate resource value.

4. A method as claimed in claim 2, wherein the candidate resource list comprises a part of the value space of the dynamically allocated connection resource.

5. A method as claimed in claim 4, wherein performing an eligibility check on a selected candidate resource value comprises:

using a TSHF that is congruent with the TSHF used by the Stateless Load Balancer serving the cluster to determine whether, when combined with an input based on the static connection data and the VIP address of the cluster, and input to the TSHF used by the Stateless Load Balancer serving the cluster, the selected candidate resource value will generate an output from the TSHF of the Stateless Load Balancer that corresponds to an identifier of the processing unit;

wherein a TSHF that is congruent with the TSHF used by the Stateless Load Balancer serving the cluster comprises a TSHF that will generate an output that is identical to the output that would be generated by the TSHF used by the Stateless Load Balancer, when provided with the same input.

6. A method as claimed in claim 5, wherein using a TSHF that is congruent with the TSHF used by the Stateless Load Balancer serving the cluster to determine whether, when combined with an input based on the static connection data and the VIP address of the cluster, and input to the TSHF used by the Stateless Load Balancer serving the cluster, the selected candidate resource value will generate an output from the TSHF of the Stateless Load Balancer that corresponds to an identifier of the processing unit, comprises:

generating a TSHF input by combining the selected candidate resource value with an input based on the static connection data and the VIP address of the cluster;

providing the generated TSHF input to a TSHF running on the processing unit that is congruent with the TSHF used by the Stateless Load Balancer serving the cluster;

obtaining an output from the TSHF running on the processing unit; and determining whether the obtained output corresponds to an identifier of the processing unit.

7. A method as claimed in claim 2, wherein the candidate resource list comprises values of the dynamically allocated connection resource that are eligible for connections to remote nodes having addressing data in a class to which the addressing data of the remote node belongs, and wherein performing an eligibility check on a selected candidate resource value comprises selecting the candidate resource value from the candidate resource list.

8. A method as claimed in claim 7, wherein the candidate resource list comprises values of the dynamically allocated connection resource which, when combined with an input comprising a class identifier of an addressing data class to which the addressing data of the remote node belongs and the VIP address of the cluster, and input to the TSHF used by the Stateless Load Balancer serving the cluster, will generate an output from the TSHF of the Stateless Load Balancer that corresponds to an identifier of the processing unit.

9. A method as claimed in claim 8, wherein the class identifier of the addressing data class to which the addressing data of the remote node belongs comprises a derivative of the addressing data of the remote node.

10. A method as claimed in claim 7, wherein identifying an eligible dynamically allocated connection resource value further comprises:

mapping the addressing data for the remote node to the addressing data class to which the addressing data of the remote node belongs;

obtaining a candidate resource list that corresponds to the addressing data class to which the addressing data of the remote node belongs; and selecting the candidate resource value from the obtained resource candidate list.

11. A method as claimed in claim 7, further comprising:

obtaining a number of addressing data classes into which to divide a remote node addressing data space;

generating class identifiers for the obtained number of addressing data classes, wherein individual addressing data from the remote node addressing data space is operable to map to a generated addressing data class identifier; and for individual addressing data classes, generating a candidate resource list comprising values of the dynamically allocated connection resource that are eligible for connections to remote nodes having addressing data in the addressing data class.

12. A method as claimed in claim 11, wherein, individual addressing data from the remote node addressing data space is operable to map to a generated addressing data class identifier by calculating a derivative of the individual addressing data using the obtained number of addressing data classes, wherein the calculated derivative comprises the class identifier of the addressing data class to which the individual addressing data is mapped.

13. A method as claimed in claim 11, wherein, for individual addressing data classes, generating a candidate resource list comprising values of the dynamically allocated connection resource that are eligible for connections to remote nodes having addressing data in the addressing data class comprises, for values sampled from the value space of the dynamically allocated connection resource:

using a TSHF that is congruent with the TSHF used by the Stateless Load Balancer serving the cluster to determine whether, when combined with an input comprising a class identifier of the addressing data class and the VIP address of the cluster, and input to the TSHF used by the Stateless Load Balancer serving the cluster, the value will generate an output from the TSHF of the Stateless Load Balancer that corresponds to an identifier of the processing unit; and if yes, adding the value to the candidate resource list;

wherein a TSHF that is congruent with the TSHF used by the Stateless Load Balancer serving the cluster comprises a TSHF that will generate an output that is identical to the output that would be generated by the TSHF used by the Stateless Load Balancer, when provided with the same input.

14. A method as claimed in claim 13, wherein using a TSHF that is congruent with the TSHF used by the Stateless Load Balancer serving the cluster to determine whether, when combined with an input comprising a class identifier of the addressing data class and the VIP address of the cluster, and input to the TSHF used by the Stateless Load Balancer serving the cluster, the value will generate an output from the TSHF of the Stateless Load Balancer that corresponds to an identifier of the processing unit, comprises:

generating a TSHF input by combining the value with the class identifier of the addressing data class and the VIP address of the cluster;

providing the generated TSHF input to a TSHF running on the processing unit that is congruent with the TSHF used by the Stateless Load Balancer serving the cluster;

obtaining an output from the TSHF running on the processing unit; and determining whether the obtained output corresponds to an identifier of the processing unit.

15. A method as claimed in claim 1, wherein an input based on the static connection data comprises at least one of:

the remote node addressing data;

a derivative of the remote node addressing data; or a class identifier of an addressing data class to which the addressing data of the remote node belongs.

16. A method as claimed in claim 1, wherein identifying an eligible and permissible dynamically allocated connection resource value for the connection comprises checking whether an eligible candidate resource value is permissible for the connection by:

checking a record of connection data for existing connections between the processing unit and remote nodes to determine whether the eligible candidate resource value is presently in use for a connection between the processing unit and the remote node; and if the eligible candidate resource value is not presently in use for a connection between the processing unit and the remote node, determining that the eligible candidate resource value is permissible for the connection, and proceeding to initiate the connection using the static connection data and the identified eligible and permissible dynamically allocated connection resource value.

17. A method for processing traffic on a bidirectional connection between a client and a remote node, the method performed by a Stateless Load Balancer serving a cluster of processing units implementing clients for a communication network node, wherein each member of the cluster comprises at least one identifier that is unique within the cluster, and wherein each member of the cluster shares the same Virtual Internet Protocol, VIP, address, the method comprising:

receiving, from a remote node, a datagram addressed to a client running on a processing unit of the cluster;
  using connection data for the connection included with the received datagram to generate an input
  providing the generated input to a Target Selector Hashing Function, TSHF, running on the Stateless Load Balancer and obtaining from the TSHF an output corresponding to an identifier of a processing unit in the cluster; and
  forwarding the received datagram to the identified processing unit;
  wherein the bidirectional connection was established using a method according to claim 1, and
  wherein the connection data for the connection included with the received datagram comprises addressing data for the remote node, the VIP address of the cluster, and the eligible and permissible dynamically allocated connection resource value identified by the processing unit when establishing the connection.

18. A computer program product comprising a non-transitory computer readable medium, the computer readable medium having computer readable code embodied therein, the computer readable code being configured such that, on execution by a suitable computer or processor, the computer or processor is caused to perform a method as claimed in claim 1.

19. A Stateless Load Balancer for processing traffic on a bidirectional connection between a client and a remote node, wherein the Stateless Load Balancer is for serving a cluster of processing units implementing clients for a communication network node, wherein each member of the cluster comprises at least one identifier that is unique within the cluster, and wherein each member of the cluster shares the same Virtual Internet Protocol, VIP, address, the Stateless Load Balancer comprising processing circuitry configured to cause the Stateless Load Balancer to:

receive, from a remote node, a datagram addressed to a client running on a processing unit of the cluster;
  use connection data for the connection included with the received datagram to generate an input;
  provide the generated input to a Target Selector Hashing Function, TSHF, running on the Stateless Load Balancer and obtaining from the TSHF an output corresponding to an identifier of a processing unit in the cluster; and
  forward the received datagram to the identified processing unit;
  wherein the bidirectional connection was established using a method according to claim 1, and
  wherein the connection data for the connection included with the received datagram comprises addressing data for the remote node, the VIP address of the cluster, and the eligible and permissible dynamically allocated connection resource value identified by the processing unit when establishing the connection.

20. A processing unit for establishing a bidirectional connection between a client and a remote node, wherein the processing unit is a member of a cluster of processing units implementing clients for a communication network node, wherein each member of the cluster comprises at least one identifier that is unique within the cluster, and wherein each member of the cluster shares the same Virtual Internet Protocol, VIP, address, the processing unit comprising processing circuitry configured to cause the processing unit to:

receive, from a client running on the processing unit, a request for a bidirectional connection to a remote node, the request including static connection data comprising addressing data for the remote node;
  identify an eligible and permissible dynamically allocated connection resource value for the connection; and
  initiate the connection using the static connection data and the identified eligible and permissible dynamically allocated connection resource value;
  wherein an eligible dynamically allocated connection resource value for the connection comprises a resource value which:
  when combined with an input based on the static connection data and the VIP address of the cluster, and input to a Target Selector Hashing Function, TSHF, used by a Stateless Load Balancer serving the cluster, generates an output from the Target Selector Hashing Function that corresponds to an identifier of the processing unit;
  and wherein a permissible dynamically allocated connection resource value for the connection comprises a resource value which:
  will not cause a protocol violation of a protocol used for establishing the bidirectional connection.

* * * * *